(12) United States Patent
Ahmed et al.

(10) Patent No.: US 10,281,279 B2
(45) Date of Patent: May 7, 2019

(54) METHOD AND SYSTEM FOR GLOBAL SHAPE MATCHING A TRAJECTORY

(71) Applicant: Invensense Inc., San Jose, CA (US)

(72) Inventors: Amr Shebl Ahmed, Calgary (CA); Jacques Georgy, Calgary (CA)

(73) Assignee: InvenSense, Inc., San Jose, CA (US)

( * ) Notice: Subject to any disclaimer, the term of this patent is extended or adjusted under 35 U.S.C. 154(b) by 77 days.

(21) Appl. No.: 15/385,412

(22) Filed: Dec. 20, 2016

(65) Prior Publication Data

US 2018/0112983 A1 Apr. 26, 2018

Related U.S. Application Data

(60) Provisional application No. 62/411,879, filed on Oct. 24, 2016.

(51) Int. Cl.
| | |
|---|---|
| *G01C 21/00* | (2006.01) |
| *G01C 21/18* | (2006.01) |
| *G01C 21/20* | (2006.01) |
| *G01C 21/16* | (2006.01) |
| *G01C 21/30* | (2006.01) |
| *G01C 25/00* | (2006.01) |

(52) U.S. Cl.
CPC ......... *G01C 21/005* (2013.01); *G01C 21/165* (2013.01); *G01C 21/18* (2013.01); *G01C 21/206* (2013.01); *G01C 21/30* (2013.01); *G01C 25/005* (2013.01)

(58) Field of Classification Search
CPC .... G01C 21/005; G01C 21/30; G01C 21/206; G01C 21/18; G01C 21/165; G01C 25/005
USPC .......................................... 701/446
See application file for complete search history.

(56) References Cited

U.S. PATENT DOCUMENTS

| | | | |
|---|---|---|---|
| 2014/0372026 A1* | 12/2014 | Georgy ................... | G01S 19/47 701/469 |
| 2015/0045072 A1* | 2/2015 | Chao ....................... | G01S 19/42 455/456.6 |
| 2017/0146349 A1* | 5/2017 | Yang ..................... | G01C 21/005 |

* cited by examiner

*Primary Examiner* — Nadeem Odeh
(74) *Attorney, Agent, or Firm* — Bay Area Technology Law Group PC

(57) ABSTRACT

The positioning/navigation solution of a portable device may be enhanced by obtaining motion sensor data, estimating a trajectory for the portable device from the motion sensor data, obtaining map information for an environment encompassing locations of the portable device, representing the estimated trajectory using a set of connected vectors and performing global shape matching for the set of connected vectors as an aggregate whole from start to end of the trajectory to the map information as a global optimization problem to derive a solution path.

62 Claims, 18 Drawing Sheets

METHOD AND SYSTEM FOR GLOBAL SHAPE MATCHING A TRAJECTORY

CROSS REFERENCE TO RELATED APPLICATIONS

This application claims priority from and benefit of U.S. Provisional Patent Application Ser. No. 62/411,879, filed Oct. 24, 2016, entitled "METHOD AND SYSTEM FOR GLOBAL SHAPE MATCHING," which is assigned to the assignee hereof and is incorporated by reference in its entirety.

FIELD OF THE PRESENT DISCLOSURE

The present disclosure relates to a method and system for subsequently enhancing at least one positioning/navigation solution derived from sensor data for a device within a platform (such as for example person, vehicle, or vessel) through the use of matching to map information, wherein the device can be strapped or non-strapped to the platform, and wherein in case of non-strapped mobility of the device may be constrained or unconstrained within the platform, and wherein the device can be tilted to any orientation and still provide seamless navigation.

BACKGROUND

Portable electronic devices, such as those configured to be handheld or otherwise associated with a user, are employed in a wide variety of applications and environments. Increasingly, such devices are equipped with one or more sensors or other systems for determining the position or motion of the portable device. Notably, devices such as smartphones, tablets, smart watches or other portable devices may feature Global Navigation Satellite Systems (GNSS) receivers, low cost Micro Electro-Mechanical Systems (MEMS) inertial sensors, barometers and magnetometers. GNSS and multi-sensors can be integrated to provide promising positioning results in most outdoor environments. However, some mass market applications require seamless positioning capabilities in all kinds of environments such as malls, offices or underground parking lots. In the absence of GNSS signals in indoor environments, the conventional strapdown Inertial Navigation System (SINS) that uses low cost inertial sensors, suffers significant performance degradation due to the accumulated sensor drifts and bias. As such, positioning technologies relying solely on motion sensors may not satisfy all requirements for seamless indoor and outdoor navigation applications.

Pedestrian Dead Reckoning (PDR) is an example of portable device indoor/outdoor positioning techniques, and has become the focus of industrial and academic research recently. Similar to the SINS, PDR accumulates successive displacement from a known starting point to derive the position. This displacement (step length) can be estimated with various algorithms within a certain accuracy using the inertial sensor measurements. The position error using step lengths from PDR accumulates much slower than that from the accelerometer derived displacement from SINS. The PDR shows improved performance over SINS without GNSS updates. However, PDR still lacks robustness because of the accumulated heading error. This shortcoming may cause a skewed path over time and produce position estimates that might not be consistent with the building layout. Therefore, the resulting navigation trajectories may cross walls, floors or other obstacles. In order to avoid these types of navigation trajectory and building layout inconsistencies, map information may be used to constrain the PDR solution to areas indicated as possible routes or a determined position may be updated to match an assumed position derived from map information.

Accordingly, it would be desirable to provide navigation techniques using available map information to enhance the accuracy and reliability of positioning applications for portable devices. It would similarly be desirable to provide map information aided techniques that operate well with seamless outdoor and indoor transition as well as handling multi-level indoor maps to reliably navigate a user in a complex multi-level indoor environment. It would further be desirable to provide map information aided techniques that may be applied subsequently so as to benefit from post facto information and processing techniques. Moreover, it would be desirable to provide map aided techniques adapted for efficient operation in client and server modes, by enabling a server to use uploaded navigation solutions of a user to subsequently generate map matched results to enhance one or more of the solutions. As will be described in the following materials, this disclosure satisfies these and other needs.

SUMMARY

As will be described in detail below, this disclosure includes a method for enhancing a navigation solution of a portable device and a platform using map information, wherein the mobility of the device is constrained or unconstrained within the platform and wherein the device may be tilted to any orientation. The method may involve obtaining sensor data for the portable device representing motion of the portable device at a plurality of epochs over a first period of time from a first position to a second position, estimating a trajectory for the portable device from the obtained sensor data over the first period of time, obtaining map information for an environment encompassing locations of the portable device during the first period of time, representing the estimated trajectory using a set of connected vectors and performing global shape matching for the set of connected vectors as an aggregate whole from the first position to the second position to the map information as a global optimization problem to derive a solution path.

This disclosure also includes a portable device for enhancing a navigation solution of the portable device and a platform using map information, wherein the mobility of the portable device is constrained or unconstrained within the platform and wherein the portable device may be tilted to any orientation. The portable device may have an integrated sensor assembly, configured to output sensor data representing motion of the portable device for the portable device at a plurality of epochs over a first period of time from a first position to a second position, a navigation module configured to derive navigation solutions based at least in part on the sensor data at a plurality of sensor epochs and estimate a trajectory for the portable device from the obtained sensor data over the first period of time and a global optimizer to obtain map information for an environment encompassing locations of the portable device during the first period of time, represent the estimated trajectory using a set of connected vectors and perform global shape matching for the set of connected vectors as an aggregate whole from the first position to the second position to the map information as a global optimization problem to derive a solution path.

Further, this disclosure includes a remote processing resource for enhancing a navigation solution of a portable device and a platform using map information, wherein the mobility of the portable device is constrained or unconstrained within the platform and wherein the portable device may be tilted to any orientation. The remote processing resource may have a communications module for receiving information provided by the portable device, wherein the information corresponds to a plurality of epochs over a first period of time of sensor data representing motion of the portable device and a global optimizer to obtain map information for an environment encompassing locations of the portable device during the first period of time from a first position to a second position, represent the estimated trajectory using a set of connected vectors and perform global shape matching for the set of connected vectors as an aggregate whole from the first position to the second position to the map information as a global optimization problem to derive a solution path.

Still further, the disclosure includes a system for providing a solution path using map information. The system may have a portable device with an integrated sensor assembly, configured to output sensor data representing motion of the portable device for the portable device at a plurality of epochs over a first period of time from a first position to a second position and a communications module for transmitting information corresponding to the epochs and remote processing resources configured to receive the information from the portable device. The remote processing resources may also have a global optimizer to obtain map information for an environment encompassing locations of the portable device during the first period of time, represent the estimated trajectory using a set of connected vectors and perform global shape matching for the set of connected vectors as an aggregate whole from the first position to the second position to the map information as a global optimization problem to derive a solution path.

DETAILED DESCRIPTION

Figure 1:
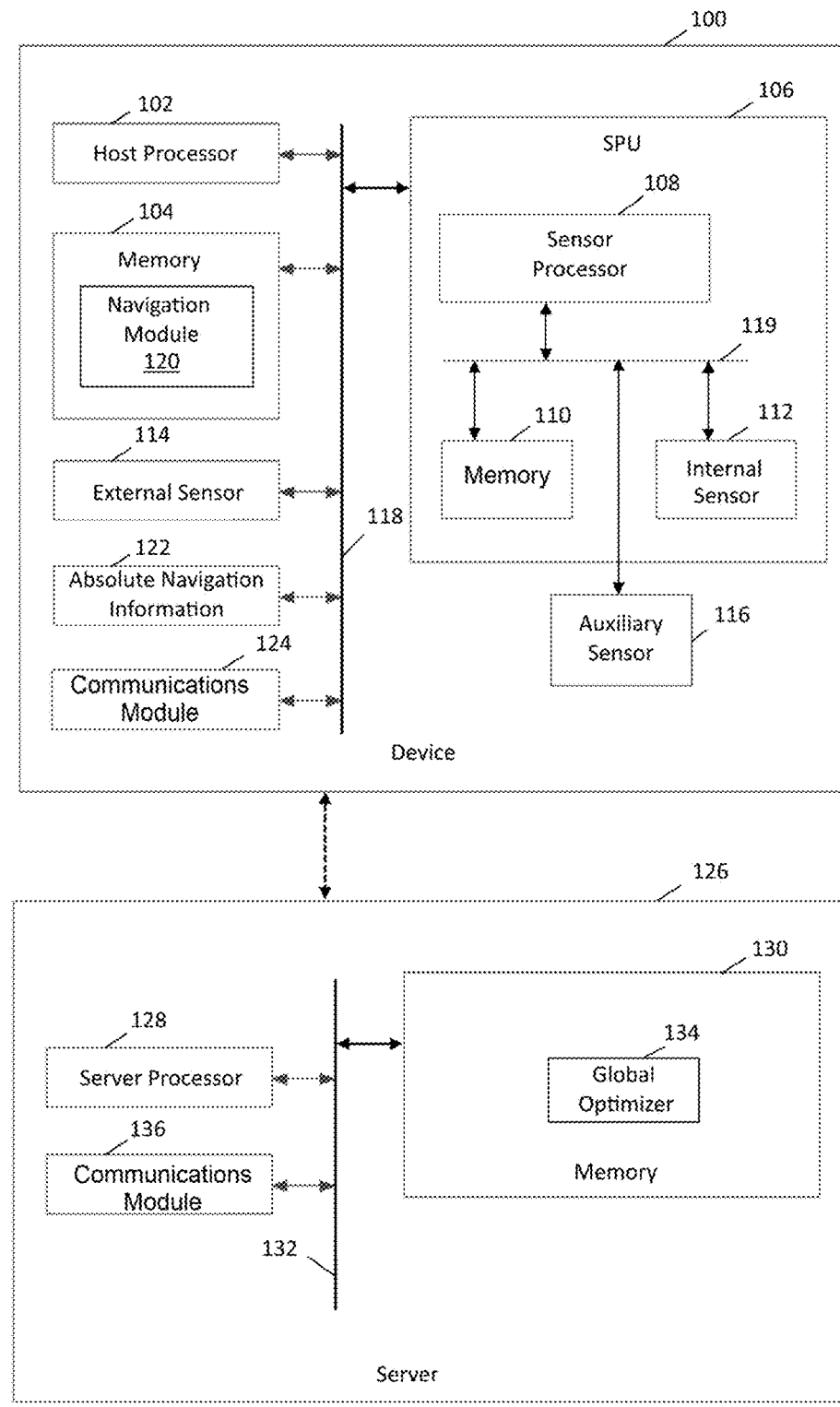
FIG. 1 is schematic diagram of a system for global shape matching according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

The techniques of this disclosure are directed to enhancing a navigation solution of a portable device using map information. Often, such portable devices may be associated with a platform that transports the device. The platform may be the user, as in the example of a smartphone being carried as a user walks, runs, swims or otherwise undergoes locomotion. In another example, the platform may be a cycling platform. The platform may also be considered a manned or unmanned vehicle or vessel that contains the device and that may or may not convey a user with the portable device, such as an automobile or other wheeled vehicle (e.g., car, truck, bus, motorcoach, or the like), boat, heavy equipment, or other motorized vessels, whether a land-based vessel, a water-based vessel, an airborne vessel, or an under-water vessel. Although the portable device generally maybe transported or conveyed in the direction of movement of the platform, its orientation may not be constrained. Returning to the example of the smartphone, it may be held in the user's hand and employed in a variety of orientations or carried in a pocket, holster, bag or other manners. In other examples, the portable device may be strapped to the platform, such as with a vehicle mount, or may be non-strapped. When non-strapped, the mobility of the device may be constrained or unconstrained within the platform and as a result, circumstances may exist such that the device can be tilted to any orientation with respect to the user or platform. The portable device may generate a series of navigation solutions over a given period of time.

As an illustration only and without limitation, a user may be carrying a smartphone while traversing a venue, such as shopping within a store. During this time, the smartphone may derive a number of navigation solutions representing the trajectory of the user through the store. In one aspect, the smartphone may use any suitable real-time technique to generate those navigation solutions, including an inertial navigation routine employing dead reckoning, a reference-based location service utilizing a source of absolute navigation information, a location beaconing system or any other suitable technique, or combinations thereof. Although of substantial benefit, these real-time solutions may nonetheless suffer from inaccuracies or limitations. Again without limitation, an inertial dead reckoning system may be subject to drift or other error accumulation over time due to the characteristics of currently-employed sensors, such as micro electromechanical systems (MEMS) or a source of absolute navigation information such as a global navigation satellite system (GNSS) may suffer from poor reception in indoor environments.

Accordingly, the techniques of this disclosure utilize the series of navigation solutions derived over the given time period to represent a trajectory from a first position to a second position. The navigation solutions used to determine the trajectory may include position, velocity or attitude determinations, in any desired combination, such as position, velocity and attitude, or position and attitude only, attitude and velocity only, or even attitude or position only. Since the navigation solution may suffer from inaccuracies, particularly over time as noted, the shape of the trajectory may be used in combination with map information regarding the environment being navigated may be used to reassess the navigation solution with improved accuracy. Correspondingly, enhancing the navigation solution may occur after the trajectory has been completed, using sensor information obtained over the course of the trajectory, along with other information as described below. The trajectory may be shape matched to the map information as a solution to a global optimization problem, such that the trajectory is considered as an aggregate whole from the first position to the second position. Restated, applying these techniques results in a path that fits the map information and provides an overall shape closest to the trajectory.

As will be described in further detail below, the techniques for enhancing a navigation solution of a portable device and a platform using map information involve obtaining sensor data for the portable device. The portable device derives navigation solutions using the sensor data. Subsequently, a trajectory determined from the navigation solutions may be globally shape matched to the map information. In some embodiments, the portable device may have sufficient processing capabilities and/or other resources available to perform the global shape matching routine locally, such as in the background when greater access to the processing capabilities is available. However, in other embodiments, the portable device may communicate the navigation solutions, any or all of the associated sensor data, or any combination of navigation solutions and sensor data to a remote server that may have greater processing capabilities and/or superior access to map information to be used in the global shape matching routine. The solution path may be used for any suitable purpose and need not involve the user directly, such as for the analysis of consumer metrics and behavior. However, the solution path may also be returned to the portable device, also for any suitable purpose, such as to provide the user with more accurate navigation information regarding the trajectory or to help improve future navigation performance of the portable device.

To help illustrate these aspects, a representative system for global shape matching is schematically depicted in FIG. 1, with portable device 100 represented by high level schematic blocks. As will be appreciated, device 100 may be implemented as a device or apparatus, such as a handheld device that can be moved in space by a user and its motion, location and/or orientation in space therefore sensed. For example, such a handheld device may be a mobile phone (e.g., smartphone, cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated sensor processing unit (SPU) 106 featuring sensor processor 108, memory 110 and inertial sensor 112. Memory 110 may store algorithms, routines or other instructions for processing data output by inertial sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, SPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using Micro Electro Mechanical System (MEMS) to be integrated with SPU 106 in a single package. Exemplary details regarding suitable configurations of host processor 102 and SPU 106 may be found in co-pending, commonly owned U.S. patent application Ser. No. 11/774,488, filed Jul. 6, 2007, and Ser. No. 12/106,921, filed Apr. 11, 2008, which are hereby incorporated by reference in their entirety. Suitable implementations for SPU 106 in device 100 are available from InvenSense, Inc. of Sunnyvale, Calif.

Alternatively or in addition, device 100 may implement a sensor assembly in the form of external sensor 114. This is optional and not required in all embodiments. External sensor may represent one or more sensors as described above, such as an accelerometer and/or a gyroscope, which output data for use in deriving a navigation solution. As used herein, "external" means a sensor that is not integrated with SPU 106 and may be remote or local to device 100. Also alternatively or in addition, SPU 106 may receive data from an auxiliary sensor 116 configured to measure one or more aspects about the environment surrounding device 100. This is optional and not required in all embodiments. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 102, memory 104, SPU 106 and other components of device 100 may be coupled through bus 118, while sensor processor 108, memory 110, internal sensor 112 and/or auxiliary sensor 116 may be coupled though bus 119, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

In one aspect, the various operations of this disclosure used to derive a navigation solution for portable device 100 may be implemented through navigation module 120 as a set of suitable instructions stored in memory 104 that may be read and executed by host processor 102. Navigation module 120 may employ a reference-based strategy, a self-contained strategy, or any combination of strategies to provide any desired degree of location awareness capabilities. For example, navigation module 120 may employ inertial navigation techniques utilizing sensor data, such as from inertial sensor 112 and/or external sensor 114, as obtained for a current sensor epoch to derive a navigation solution for that epoch. Such techniques may involve dead reckoning or the like, and may determine an orientation for device 100, including values such as any roll, pitch, and azimuth (heading) angles. The navigation solutions derived by navigation module 120 represent contemporaneous determinations of position information for portable device 100. Still further, navigation module 120 may also be configured to determine a motion mode that indicates the user's motion patterns, which may include without limitation, walking, driving, running, going up/down stairs, riding an elevator, walking/standing on an escalator, and other similar motion patterns.

Navigation module 120 may also use a source of absolute navigation information 122, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons or other similar methods when deriving a navigation solution. This is optional and not required in all embodiments. Navigation module 120 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Further, portable device 100 may also have a communications module 124 for transmitting and/or receiving information, including navigation solutions derived by navigation module 120.

Multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102 and SPU 106, for example, to transmit desired sensor processing tasks.

In this exemplary system, portable device 100 communicates raw sensor data, navigation solutions and/or a complete trajectory from the first position to the second position derived from the navigation solutions to any suitable remote processing resources, such as server 126. The information encompasses the plurality of sensor epochs over the first period of time. Subsequent to the first period of time, server 126 may then estimate a complete trajectory using the raw sensor data and/or navigation solutions, or may use the complete trajectory received from device 100, to perform a global shape matching routine according to the techniques of this disclosure. One suitable architecture of server 126 is depicted using high level schematic blocks in FIG. 1, and may include server processor 128 that is in communication with memory 130 over bus 132. As will be described in further detail below, server processor 128 may execute instructions stored in memory 130 that are represented as functional blocks, including global optimizer 134, which is configured to shape match the complete trajectory to map information for the relevant environment to derive a solution path. Either or both navigation module 120 and global optimizer 134 may determine a motion mode, but server 126 may have advantages associated with the availability of both past and future information for motion detection at a given time and/or may have greater processing resources available to perform more sophisticated algorithms, and correspondingly may be give greater weight if conflicting detections exist.

Server 126 may also include a communications module 136 to receive the noted information from portable device 100 derived by navigation module 120, and if desired, may transmit information related to the solution path to portable device 100 or to another destination. Communications between portable device 100 and server 126 may employ any suitable protocol. For example, a shorter range, low power communication protocol such as BLUETOOTH®, ZigBee®, ANT or a wired connection may be used or a longer range communication protocol, such as a transmission control protocol, internet protocol (TCP/IP) packet-based communication, accessed using a wireless local area network (WLAN), cell phone protocol or the like may be used. In general, the system depicted in FIG. 1 may embody aspects of a networked or distributed computing environment. Portable devices 100 and server 126 may communicate either directly or indirectly, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As noted, portable device 100 may derive the navigation solutions and server 126 may perform a global shape matching routine to provide a solution path corresponding to the trajectory. However, any or all of the functions described as being performed may be performed by any number of discrete devices in communication with each other, or may be performed by portable device 100 itself in other suitable system architectures. Accordingly, it should be appreciated that any suitable division of processing resources may be employed whether within one device or among a plurality of devices. Further, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 102, sensor processor 108, server processor 128, a dedicated processor or any other processing resources of portable device 100, server 126 or other remote processing resources, or may be implemented using any desired combination of software, hardware and firmware.

Figure 2:
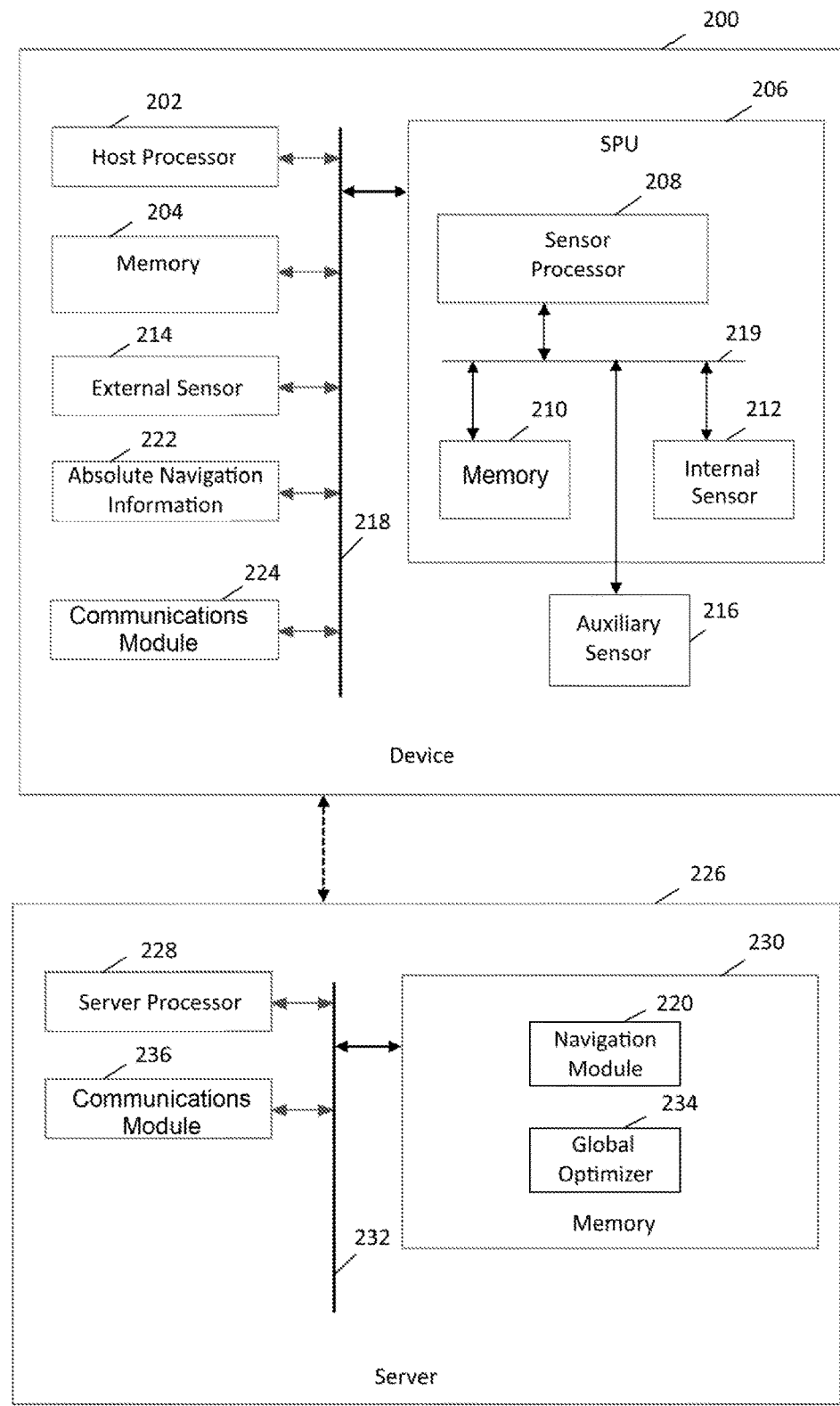
FIG. 2 is schematic diagram of another system for global shape matching according to an embodiment.

Within this disclosure, reference may be made to the embodiment of FIG. 1 for the sake of convenience, however, it should be appreciated that many other architectures and system configurations may be employed. Thus, the techniques may be adapted to these and other embodiments as will be recognized by one of ordinary skill in the art. For example, another embodiment is schematically depicted in FIG. 2. Here, similar components have corresponding reference numbers (such as, portable device 100 of FIG. 1 may correspond to portable device 200 of FIG. 2). As such, portable device 200 includes a host processor 202, which may be one or more microprocessors, central processing units (CPUs), or other processors to run software programs, which may be stored in memory 204, associated with the functions of device 200. Multiple layers of software can be provided in memory 204. Device 200 includes at least one sensor assembly, as shown here in the form of integrated motion processing unit (SPU) 206 featuring sensor processor 208, memory 210 and inertial sensor 212. Memory 210 may store algorithms, routines or other instructions for processing data output by inertial sensor 212 and/or other sensors as described below using logic or controllers of sensor processor 208, as well as storing raw data and/or motion data output by inertial sensor 212 or other sensors. Inertial sensor 212 may be one or more sensors for measuring motion of device 200 in space, such as a gyroscope and/or an accelerometer as described above. Device 200 may also implement a sensor assembly in the form of external sensor 214. This is optional and not required in all embodiments. Also alternatively or in addition, SPU 206 may receive data from an auxiliary sensor 216 configured to measure one or more aspects about the environment surrounding device 200. This is optional and not required in all embodiments. In this embodiment, host processor 202, memory 204, SPU 206 and other components of device 200 may be coupled through bus 218, while sensor processor 208, memory 210, internal sensor 212 and/or auxiliary sensor 216 may be coupled though bus 219, either of which may be any suitable bus or interface. Device 200 may also have a source of absolute navigation information 222, which is optional, and may have a communications module 224 for transmitting and/or receiving information, including solution paths derived remotely.

In this exemplary system, portable device 200 communicates raw sensor data for a plurality of sensor epochs over a first period of time to server 226, which may include a navigation module 220 to derive a navigation solution for portable device 200 for the raw sensor data at each epoch. Navigation module 220 may be implemented as a set of suitable instructions stored in memory 230 that may be read and executed by server processor 228. Bus 232, similar to those described above, may be used to couple these and other elements of server 226. As noted above, the navigation solutions may include any position, velocity and/or attitude information for the plurality of epochs. The navigation solutions may be used to derive a complete trajectory for device 200 from the first position to the second position. Subsequent to the first period of time, server 226 may then perform a global shape matching routine according to the techniques of this disclosure with global optimizer 234 using the complete trajectory to derive a solution path. Server 226 may also include a communications module 236 to receive raw sensor data for portable device 200, and if desired, to transmit information related to the solution path to portable device 200 or to another destination.

Figure 3:
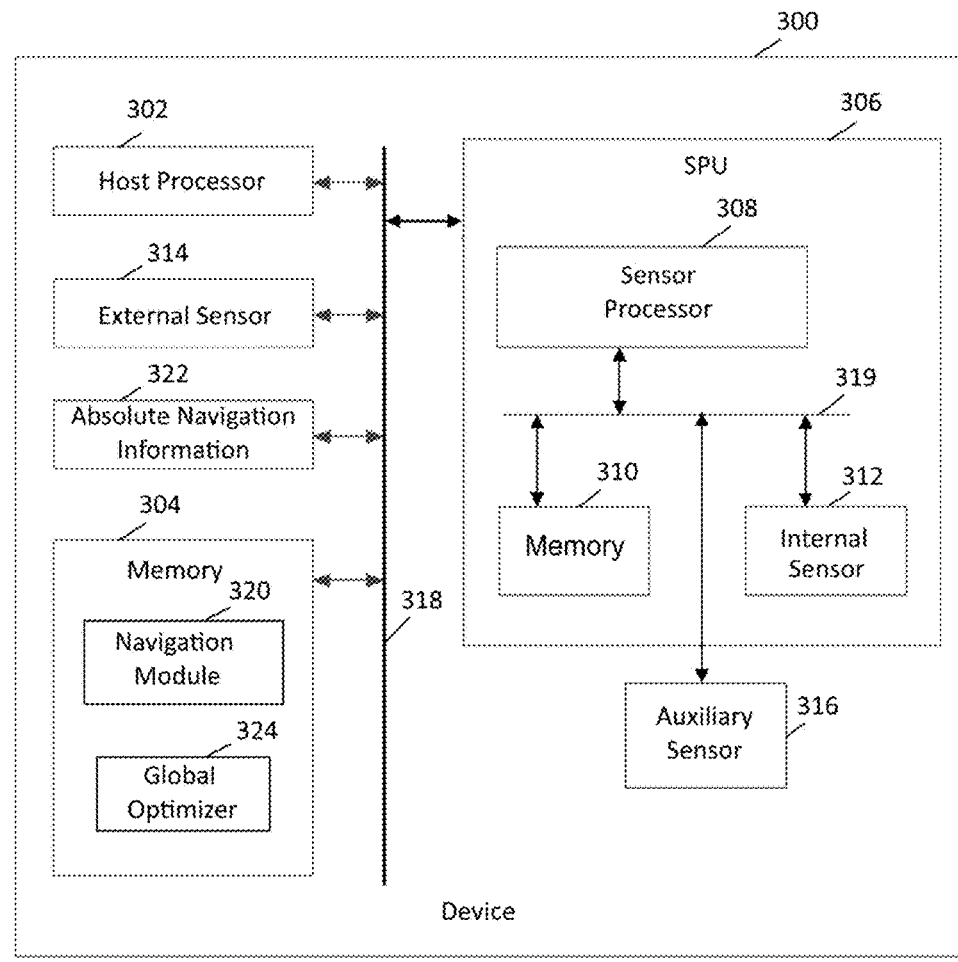
FIG. 3 is schematic diagram of a device for global shape matching according to an embodiment.

As another illustrative example, the embodiment schematically depicted in FIG. 3 represents a device in which the global shape matching routine is performed locally. Again, similar components have corresponding reference numbers (such as, portable device 100 of FIG. 1 may correspond to portable device 300 of FIG. 3). Accordingly, portable device 300 includes a host processor 302, which may be one or more microprocessors, central processing units (CPUs), or other processors to run software programs, which may be stored in memory 304, associated with the functions of device 300. Multiple layers of software can be provided in memory 304. Device 300 includes at least one sensor assembly, as shown here in the form of integrated motion processing unit (SPU) 306 featuring sensor processor 308, memory 310 and inertial sensor 312. Memory 310 may store algorithms, routines or other instructions for processing data output by inertial sensor 312 and/or other sensors as described below using logic or controllers of sensor processor 308, as well as storing raw data and/or motion data output by inertial sensor 312 or other sensors. Inertial sensor 312 may be one or more sensors for measuring motion of device 300 in space, such as a gyroscope and/or an accelerometer as described above. Device 300 may also implement a sensor assembly in the form of external sensor 314. This is optional and not required in all embodiments. Also alternatively or in addition, SPU 306 may receive data from an auxiliary sensor 316 configured to measure one or more aspects about the environment surrounding device 300. This is optional and not required in all embodiments. In the embodiment shown, host processor 302, memory 304, SPU 306 and other components of device 300 may be coupled through bus 318, while sensor processor 308, memory 310, internal sensor 312 and/or auxiliary sensor 316 may be coupled though bus 319, either of which may be any suitable bus or interface. Device 300 may also have a source of absolute navigation information 322, which is optional and not required in all embodiments.

In this embodiment, portable device 300 includes navigation module 320, representing instructions stored in memory 304 for execution by host processor 302 to derive a navigation solution for portable device 300 using the sensor data at each epoch. Subsequent to the first period of time, device 300 may then perform a global shape matching routine according to the techniques of this disclosure using the navigation solutions from navigation module 320 to provide a solution path for at least one of the sensor epochs. Host processor 302 may execute instructions that are represented as functional blocks, including global optimizer 324, using similar techniques.

Figure 4:
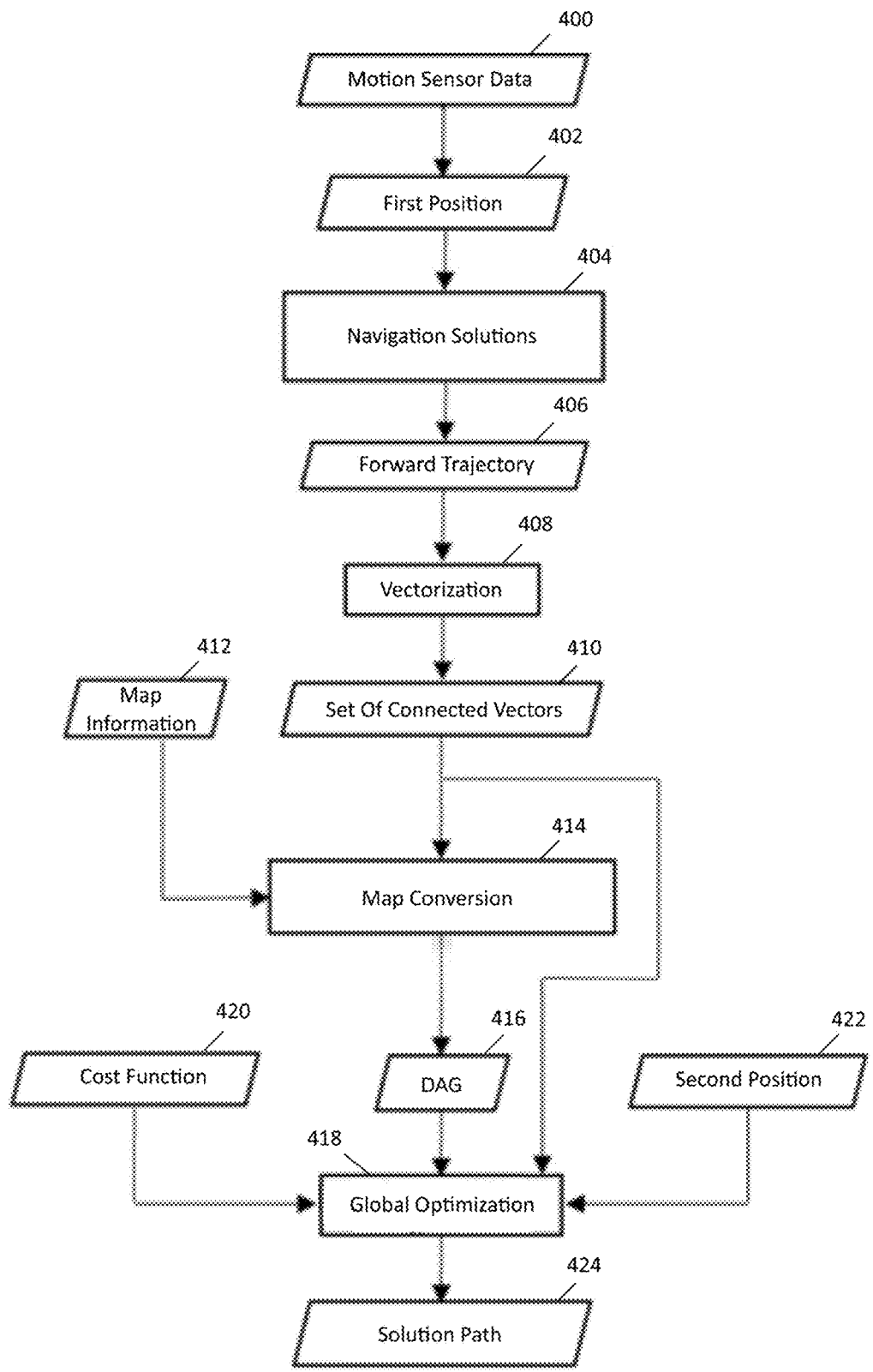
FIG. 4 is a flowchart of a routine for global shape matching using a forward trajectory according to an embodiment.

A representative routine involving the techniques of this disclosure is depicted in FIG. 4. In this disclosure, operations or processes are designated with rectangles while inputs or outputs are designated with parallelograms. Beginning with 400, sensor data may be obtained for a plurality of epochs over a given time period, such as from inertial sensor 112 and/or external sensor 114, for the portable device. A first position 402 may be input, based on a known bounding point of the trajectory that may be determined in any suitable way, including an entrance to area being traversed or other type of constraint. As an illustration only, suitable boundary points of the trajectory may be determined using beacons located at entrances or exits of a venue. Using the sensor data and integrating from the first position, navigation module 120 may derive a navigation solution at each sensor epoch in 404. In embodiments where global shape matching is performed remotely, either the raw sensor data, the derived navigation solutions or both may be transmitted to remote processing resources, such as server 126. For example, the derivation of navigation solutions for each sensor epoch may be performed by navigation module 120 at portable device 100 or may be performed at server 126 using the raw sensor data for each sensor epoch as transmitted by portable device 100. In other embodiments, portable device 100 may perform the global shape matching locally.

Regardless of whether the global shape matching occurs locally or remotely, the navigation solutions of 404 may be used to estimate a forward trajectory 406 for portable device 100. This trajectory is termed "forward" because it corresponds to the temporal sequence of epochs at which the motion sensor data was obtained. In 408, the trajectory is vectorized in a piece-wise linear manner as will be described in more detail below. Accordingly, the output may be a set of connected vectors (i.e., the vectorized solution) representing the trajectory as indicated in 410. To formulate the optimization problem, map information 412 may be converted in 414 to output a directed acyclic graph (DAG) 416. This conversion step may require the number of vectors in the vectorized solution as an input to specify the number of rows in the graph as will be clarified later. A global optimization may be performed in 418, using as inputs the set of connected vectors 410, a suitable cost function 420, the second position 422 and the DAG 416 as shown. The optimization may be performed by applying graph theory to shape match the trajectory to the map information, such as through the execution of instructions associated with global optimizer 134. The second position 422 may be determined by a suitable constraint, such as a cash register check out, an exit or the like, as another input. A shortest path algorithm may be applied within the optimization algorithm to produce the solution path as indicated by 424.

Figure 5:
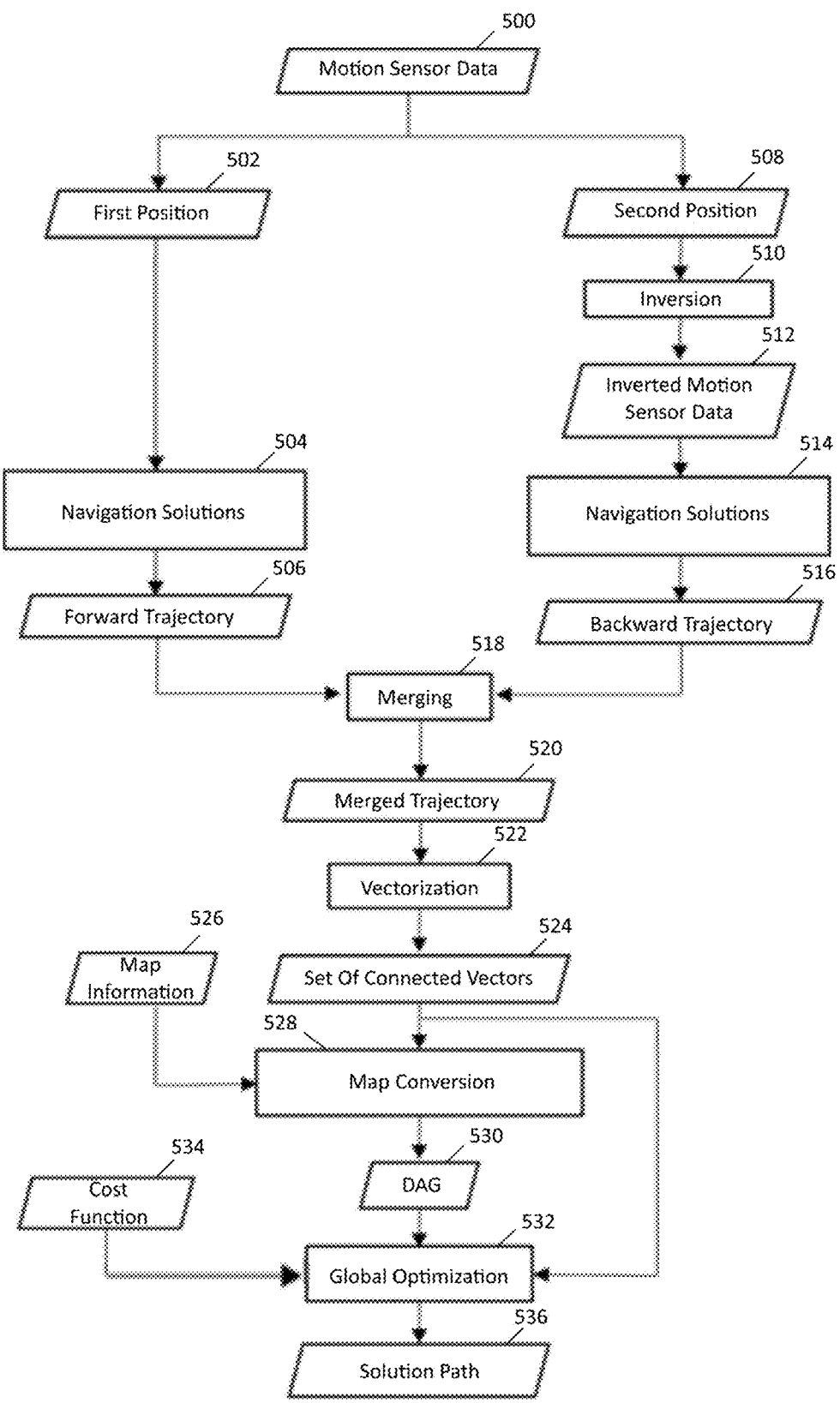
FIG. 5 is a flowchart of a routine for global shape matching using a merged trajectory according to an embodiment.

An alternative routine is depicted in FIG. 5. Similarly, motion sensor data may be obtained for a plurality of epochs over a given time period, such as from inertial sensor 112 and/or external sensor 114, for the portable device in 500. Blocks 502 to 506 correspond to the respective counterparts 402 to 406 as described with regard to FIG. 4 for estimating a forward trajectory. A parallel process beginning with 508 receives the second position as an input. In 510, an inversion operation may be applied to the motion sensor data to produce inverted motion sensor data as indicated in 512. Here, the inverted sensor data may be integrated from the second position to derive navigation solutions 514 that may be used to estimate a backward trajectory 516. Here, this trajectory is termed "backward" because the navigation solutions are processed in the reverse order of the temporal sequence of epochs at which the motion sensor data was obtained. A merging operation is performed in 518 to produce a merged trajectory as indicated by 520. In an alternative embodiment, the backward trajectory obtained in this manner may be used instead of the forward trajectory 406 noted in FIG. 4, with the modification that the first position would then be used as an input to the shortest path algorithm 420 rather than the second position.

The remaining operations may be performed in a similar manner to those described for FIG. 4, including performing a vectorization operation 522 on the merged trajectory to obtain a set of connected vectors 524. Again, map information 526 may be converted in 528 to a DAG 530, possibly based in part on the vectorized solution. Global optimization may be performed in 532, which may include applying a shortest path algorithm, using the connected vectors 524, a cost function 534 and DAG 530 as inputs. The second position is not used as an input to the shortest path algorithm in this embodiment as it has already been accounted for when estimating the backward trajectory as described above. The result of the optimization algorithm produces the solution path 536.

These techniques may be applied for any sensor-based positioning and/or navigation solution whether it is tethered or non-tethered, i.e. whether it is coming from a device tethered to the moving platform or whether the device is a portable device that can move within the platform or change orientation. Further, a sensor-only based positioning/navigation solution or a sensor-based positioning/navigation solution that is integrated with absolute navigational information, such as for example, Global Navigation Satellite System (GNSS) or other wireless positioning systems such as WiFi positioning, Cell positioning, Bluetooth or Bluetooth Low Energy (BLE)-based positioning may be employed. As noted above, these techniques may be applied with any mode of motion or conveyance, i.e. with any type of moving platform; the moving platform can be a person in case of on-foot activity such as walking or running, the moving platform can be any type of vehicle (such as a car, bus, train, drone, plane . . . ) or vessel.

Still further, these techniques may be applied to trajectories in any type of environment, such as indoor or outdoor, such as land-based, aerial or underwater suitable map information for the environment that allows performing global shape matching of the positioning/navigation solution to the map. One example is a person walking or running indoor in mapped environments such as shopping malls, retail stores, offices, airports, hospitals, museums and other venues. Another example is a person walking, running, cycling or otherwise traversing an environment on mapped trails (i.e. trails for which map information exists). Yet another example applies to land-based vehicles (car, bus, train, . . . ) that operate on streets or other defined pathways for which map information of the street network is available. Map information may also exist for a network of pipelines or other conduits, which may be traversed using a remote vehicle or the like. A still further example applies to airborne vehicles (plane, helicopter, glider, drone, . . . ) that may operate on defined flight paths. Although embodiments are discussed in the context of an indoor environments such as a retail store, these should be considered as an illustration only.

Especially for challenging and long indoor trajectories, existing map matching techniques suffer from a progressive aspect in that subsequent determinations may be unduly influenced by a previous determination. For example, a local problem with one navigation solution for an epoch may be limited in effect, so that impact on the overall solution is reduced. The techniques of this disclosure represent a global matching method that deals with the trajectory as an aggregate whole from start to end, without the drawbacks involved with progressive aspects and may be effectively leveraged offline.

In one aspect, performing global shape matching as a global optimization problem uses graph theory.

In one aspect, estimating the trajectory for the portable device may include generating a forward trajectory using the sensor data beginning at the first position. The forward trajectory may be compensated for estimated drift. The drift may be estimated based at least in part on comparing a heading determined at the second position from the sensor data with a heading taken from the estimated trajectory at the second position. The drift may be estimated based at least in part on determining a rate of heading change from the sensor data during a portion of the estimated trajectory exhibiting straight motion or no motion.

In one aspect, estimating the trajectory for the portable device may include generating a backward trajectory using the sensor data beginning at the second position and merging the forward trajectory and the backward trajectory. Generating the backward trajectory may involve inverting the sensor readings. Merging the forward trajectory and the backward trajectory may include combining accumulated change in heading and distance travelled for the forward trajectory and the backward trajectory. Merging the forward trajectory and the backward trajectory may include combining consecutive change in latitude and longitude for the forward trajectory and the backward trajectory.

In one aspect, the estimated trajectory may be based on at least one of a forward trajectory and a backward trajectory and wherein generating at least one of the forward trajectory and the backward trajectory includes a smoothing operation over the first period of time.

In one aspect, the estimated trajectory may be based on at least a backward smoothing operation over the first period of time.

In one aspect, the estimated trajectory may be based on at least a multiple pass smoothing operation over the first period of time.

In one aspect, the estimated trajectory may be based on at least one of a forward trajectory and a backward trajectory and wherein generating at least one of the forward trajectory and the backward trajectory may include filtering heading information for the navigation solution of at least one epoch. Filtering heading information may include applying a zero-phase low pass filter.

In one aspect, representing the estimated trajectory using the set of connected vectors may include providing a piece-wise linearized approximation of the estimated trajectory. The piece-wise linearized approximation may be a series of points on the estimated trajectory, such that each successive pair of points defines a vector in the set of connected vectors. Representing the estimated trajectory using the set of connected vectors may also include minimizing a number of vectors in the set of connected vectors while satisfying an error threshold. Representing the estimated trajectory using the set of connected vectors may also include combining sequential vectors when a change in vector angles is below a threshold.

In one aspect, the map information may be a grid map of connected links and nodes. The grid map may represent at least one of an indoor venue, a retailer venue, an outdoor venue, a street map, a trails map a pipeline map and a flight map.

In one aspect, global shape matching of the set of connected vectors to the map information may include matching nodes of the grid map to nodes of the set of connected vectors, wherein each connection between adjacent vectors defines a node of the set of connected vectors. Global shape matching of the set of connected vectors to the map information may also include representing the grid map as a directed acyclic graph having a number of rows equivalent to a number of vectors in the set of connected vectors plus one. Global shape matching of the set of connected vectors to the map information may also include evaluating the set of connected vectors and the links between nodes of the directed acyclic graph with a cost function. The cost function may depend at least in part on: (i) a difference in length between nodes of the directed acyclic graph and a corresponding vector from the set of connected vectors, and (ii) on a difference between the "angle between a link and a preceding link" and the "angle between the corresponding vector and its preceding vector". The value of the cost function may be assigned to the link as its cost. Global shape matching of the set of connected vectors to the map information may also include applying a shortest path algorithm.

In one aspect, global shape matching of the set of connected vectors to the map may include utilizing an anchor point associated with the estimated trajectory. Utilizing an anchor point may include identifying the anchor point associated with the estimated trajectory. A plurality of anchor points associated with the estimated trajectory may be obtained. The solution path may be constrained to include the anchor point, the estimated trajectory may be constrained using the anchor point, the anchor point may be integrated with the navigation solution before estimating the trajectory and/or the global optimization problem may be weighted based on proximity to the anchor point. The anchor point may be derived from a source of absolute navigation information for the portable device, such that the absolute navigation information is obtained from any one or any combination of the following: (i) a global navigation satellite system (GNSS); (ii) cell-based positioning; (iii) WiFi-based positioning; (iv) Bluetooth-based positioning; (v) other wireless-based positioning; and (vi) visual light communication based positioning. The anchor point may be derived from point of sale information. The anchor point may be derived from an interaction between the portable device and an item having a known location.

In one aspect, a floor change may be detected in the estimated trajectory. The estimated trajectory may be segregated into a plurality of subtrajectories based at least in part on the detected floor change and global shape matching to the map information may be performed for each subtrajectory. A floor change modality and location may be known, but when ambiguity exists, at least one alternative subtrajectory may be estimated based at least in part on the detected floor change covering a different assumption regarding the floor change modality and location, such that the method may also involve performing global shape matching for each estimated subtrajectory, reconstructing possible estimated trajectories from alternative subtraejctories and comparing results for each possible estimated trajectory to derive the solution path.

In one aspect, user analytics may be derived based at least in part on the solution path and/or aggregate user analytics may be derived based at least in part on aggregating solution paths derived for a plurality of trajectories within the environment for the users.

In one aspect, solution paths derived for a plurality of trajectories within the environment may be crowdsourced by aggregation. Sensor measurements taken with the portable device may be recorded and correlated with at least one location along the solution path. A fingerprint map may be built with the recorded sensor measurements.

In one aspect, an overall uncertainty for the solution path may be determined. The overall uncertainty may be (i) cross-track uncertainty, (ii) along-track uncertainty, or (iii) a combination of cross-track and along-track uncertainties. Uncertainty may be determined for at least one of the estimated trajectory, the set of connected vectors and the global shape matching to the map information. Uncertainty associated with the solution path may be determined such that user analytics may be derived based at least in part on the solution path and the determined uncertainty. Uncertainty associated with the solution path may be determined such that solution paths derived for a plurality of trajectories within the environment may be crowdsourced by aggregating the solution paths based at least in part on the determined uncertainty.

As noted, this disclosure may also include a portable device for enhancing a navigation solution of the portable device and a platform. In one aspect, the portable device may have a source of absolute navigation and the global shape matching may be based at least in part on the absolute navigation information. The absolute navigation information may be obtained from any one or any combination of the following: (i) a global navigation satellite system (GNSS); (ii) cell-based positioning; (iii) WiFi-based positioning; (iv) Bluetooth-based positioning or (v) other wireless-based positioning.

In one aspect, the sensor assembly may include an accelerometer and a gyroscope. The sensor assembly may be an inertial sensor implemented as a Micro Electro Mechanical System (MEMS).

This disclosure may also include a remote processing resource as noted above. In one aspect, the information received by the communications module may be sensor data for the portable device representing motion of the portable device at the epochs and wherein the remote processing resource may be further configured to derive navigation solutions for the epochs based at least in part on the sensor data and estimate the trajectory from the derived navigation solutions.

In one aspect, the information received by the communications module may be navigation solutions derived for the epochs by the portable device such that the remote processing resource may be further configured to estimate the trajectory from the derived navigation solutions.

In one aspect, the information received by the communications module may be the estimated trajectory.

In one aspect, the communications module may be configured to transmit the solution path to the portable device.

Still further, the disclosure includes a system for providing a solution path using map information. In one aspect, the information received by the remote processing resources of the system may be sensor data for the portable device and wherein the remote processing resources are further configured to derive navigation solutions for the epochs based at least in part on the sensor data and estimate the trajectory from the derived navigation solutions.

In one aspect, the portable device of the system may have a navigation module configured to derive navigation solutions based at least in part on the sensor data at the plurality of epochs, such that the communications module transmits the navigation solutions to the remote processing resources of the system and the remote processing resources may estimate the trajectory from the received navigation solutions.

In one aspect, the portable device of the system may have a navigation module configured to derive navigation solutions based at least in part on the sensor data at the plurality of epochs and to estimate the trajectory from the derived navigation solutions, such that the communications module transmits the estimated trajectory to the remote processing resources of the system.

In one aspect, the remote processing resources of the system may transmit the solution path to the portable device.

In one aspect, the portable device may be conveyed by a platform selected from a person, a vehicle, a cycling platform, a land-based vessel, a water-based vessel, an airborne vessel, and an under-water vessel.

Examples

Figure 6:
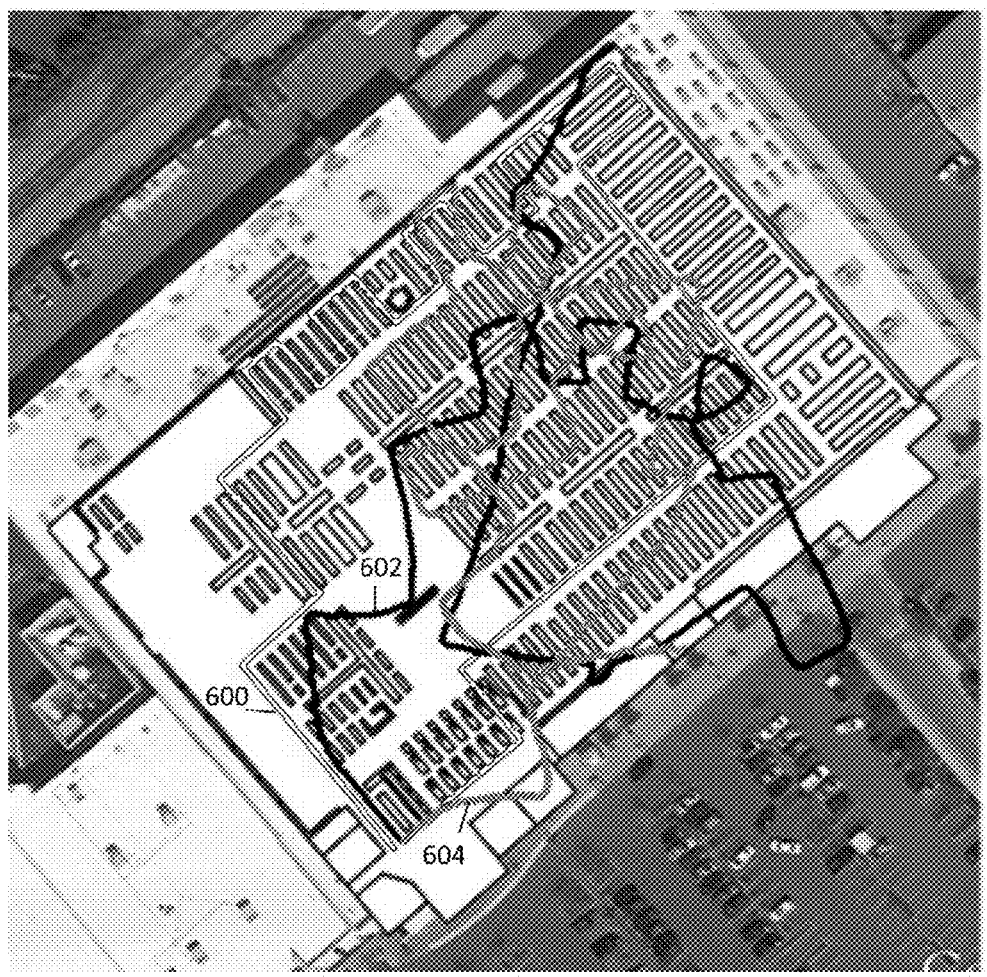
FIG. 6 is a schematic representation comparing a reference trajectory to forward and backward trajectories according to an embodiment.

In the embodiments discussed above with regard to FIGS. 4 and 5, motion sensor data may be processed to generate navigation solutions from which a trajectory may be estimated. These may be considered sensor-based navigation solutions, and in some embodiments, may be supplemented with a suitable source of absolute navigation information when available. The trajectory estimated from the navigation solutions is used as the input for the global shape matching routine of this disclosure. For example, as schematically depicted in FIG. 6, a user may traverse a retail venue with device 100 generating motion sensor data based upon the actual path taken, indicated here as outline trace 600 as reference. The operations described above with regard to FIGS. 4 and 5 may be performed to estimate a forward trajectory, indicated as solid trace 602, a backward trajectory, indicated as cross hatched trace 604, or both. As noted, the forward trajectory may be estimated by integrating the motion sensor data from the first position, while the backward trajectory may be estimated by inverting the motion sensor data and integrating from the second position.

Depending on the navigation algorithm employed, one or more transformations may be applied to the input data to convert the data from a format corresponding to beginning at the first position and ending at the second position to beginning at the second position and ending at the first position for use in backward processing to estimate the backward trajectory. Different transformations may be applied depending on the nature of the input data. Notably, depending on the embodiment, a portable device such as portable device 100 may have different input information. As described, the input information may include motion sensor data from inertial sensors, such as gyroscopes or accelerometers. The input information may also include absolute navigation information when a source of such information is available and when the portable device is configured to receive it. Still further, the input data may include supplemental navigation information, such as may be obtained from a barometer, a magnetometer, an odometer, a speedometer or user dynamics (e.g., a pedestrian motion model). Any available input data used for forward processing may be transformed as appropriate to allow backward processing by using the forward processing algorithm. Alternatively, a backward processing algorithm may be employed that does not necessarily require transformation of some or all of the input data. Further details regarding these aspects may be found in co-pending, commonly-assigned U.S. patent application Ser. No. 15/054,792, filed Feb. 26, 2016, which is entitled "METHOD AND SYSTEMS FOR MULTIPLE PASS SMOOTHING," and is incorporated by reference in its entirety.

When either a forward trajectory or a backward trajectory is used alone, it may be vectorized directly according to the discussion below. However, when both forward and backward trajectories are estimated, a merging operation 518 may be performed. Since the forward and backward trajectories both include information about the actual path, they may be merged together as desired. In one embodiment, merging may be performed by representing each of the forward and backward trajectories by two arrays of accumulated change in heading ($\Delta\Theta_f$ & $\Delta\Theta_b$) and distance travelled ($\Delta d_f$ & $\Delta d_b$). Correspondingly, an array of $\Delta d_m$ and $\Delta\Theta_m$ that defines the merged trajectory may be found by calculating the weighted average between values of the forward and the backward trajectories according to Equation (1) and Equation (2), where ω is an appropriate weighting function:

$$\Delta\Theta_m(t)=\omega(t)*\Delta\Theta_f(t)+(1-\omega(t))*\Delta\Theta_b(t) \quad (1)$$

$$\Delta d_m(t)=\omega(t)*\Delta d_f(t)+(1-\omega(t))*\Delta d_b(t) \quad (2)$$

In these equations, averaging may be performed at the delta level to reduce the effect of the drift and the accumulation of error through integration when estimating the forward and backward trajectories. Selecting a weighting function used to find the weighted average may start with a relatively high value to bias the forward trajectory at the first position. As the integration progresses, the value of the function may decrease so that relatively increased weight is given to the backward solution until it reaches a maximum bias towards the backward trajectory at the second position. Depending upon the embodiment, the weighting function may be applied in different forms. In one example, the weighting function may have a line form as represented by Equation (3), where T is the time duration between the first and second positions:

$$\omega(t) = 1 - \frac{t}{T} \quad (3)$$

As another example, the weighting function may take a quadratic form as represented by Equation (4):

$$\omega(t) = 1 - \left(\frac{t}{T}\right)^2 \quad (4)$$

The weighting function may take an exponential form as yet another example indicated by Equation (5):

$$\omega(t) = \frac{e - e^{t/T}}{e - 1} \quad (5)$$

Figure 7:
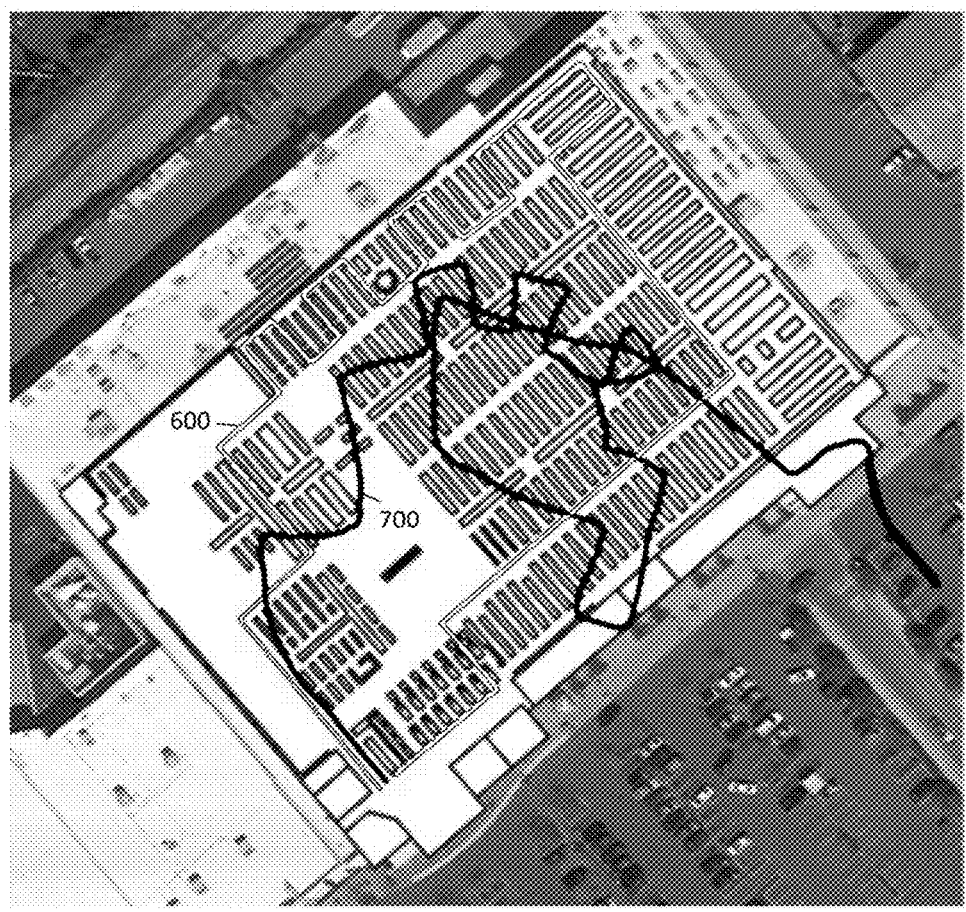
FIG. 7 is a schematic representation comparing a reference trajectory to a merged trajectory according to an embodiment.

Merging the forward and backward trajectories may provide headings for device 100 that are smoothed as compared to the individual trajectories. To illustrate, FIG. 7 shows the merged trajectory as black trace 700 as compared to the reference trajectory, which is again represented by outline trace 600.

Instead of using the heading and distance arrays when merging trajectories, another suitable operation is to represent the forward and the backward solutions in the form of consecutive change in latitude ($\Delta lat_f$ & $\Delta lat_b$) and longitude ($\Delta lng_f$ & $\Delta lng_b$). Correspondingly, the forward and backward trajectories may be merged in terms of latitude and longitude in a similar manner to the heading and distance merging described above. For example, Equations (6) and (7) may be used for latitude and longitude, respectively, with the appropriate weighting function ω:

$$\Delta lat_m=\omega(t)*\Delta lat_f+(1-\omega(t))*\Delta lat_b \quad (6)$$

$$\Delta lng_m=\omega(t)*\Delta lng_f+(1-\omega(t))*\Delta lng_b \quad (7)$$

In some embodiments, an optional correction may be made to the merged trajectory. As will be appreciated from the examples shown in FIGS. 6 and 7, each trajectory exhibits a continuous, accumulating drift which may be attributed to the characteristics of the inertial sensors being used. The drift may result in a distortion of the trajectory and may provide a final heading that is not the same as expected. Accordingly, the drift may be compensated by estimating the magnitude and direction of the heading drift over the trajectory as a whole. Further, although the discussion is in the context of a merged trajectory, a similar approach may be applied to either of the forward and backward trajectories if only one is being employed as discussed with respect to FIG. 4.

Figure 8:
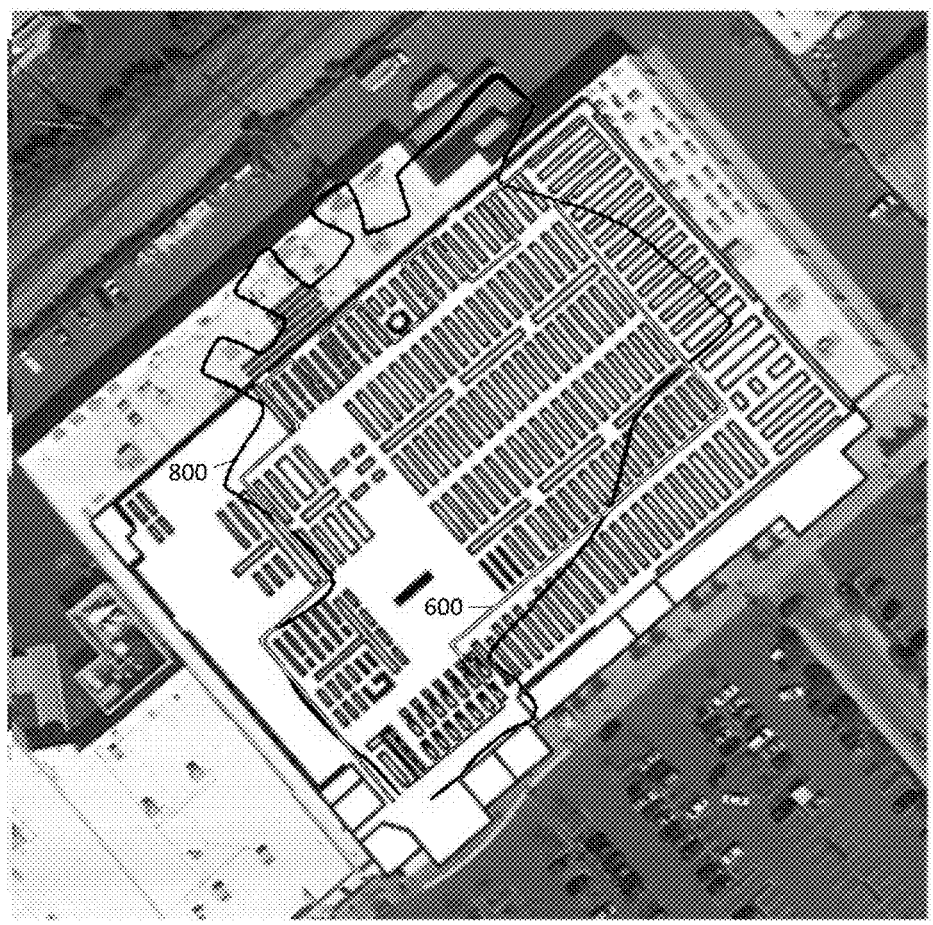
FIG. 8 is a schematic representation comparing a reference trajectory to a merged trajectory compensated for drift according to an embodiment.

The magnitude of the overall drift may be estimated in any suitable manner. As one example, by comparing the final heading from the merged trajectory to a known final heading at the second position, the magnitude of the drift across the entire trajectory may be estimated by the difference between these two headings. As another example, the change in heading per unit time may be calculated for a portion of the trajectory in which there is no motion or in which the user is moving in a straight line. Although magnitude may be estimated using either example, the direction of the drift may be estimated by determining the direction in which the heading is changing while stopping or moving in a straight line. To illustrate the effects of these techniques, FIG. 8 compares the merged trajectory after drift compensation, shown as black trace 800, with the reference shown as outline trace 600.

As desired, other operations may be performed on the forward or backward trajectory, or on the merged trajectory to improve their usability during the global shape matching routine. In one embodiment, the input heading from the navigation solution provided by navigation module 120 may be expected to be the platform heading, and may be derived from the difference between the device heading and an estimated misalignment angle. In some situations, this derived platform heading from the navigation solution may exhibit a periodic heading oscillation or a sine-wave like heading undulations, depending on the use case of portable device. The use case is a characterization of the type of interaction between a portable device and the user, and may include whether the user is carrying the device, holding the device with a swinging arm or "dangling," positioning it "on ear" when talking, inputting data or viewing in a navigation or texting operation, carrying the device in a pocket or other container or holder, and other usages of the device that affect its orientation with respect to the user. For example, pocket or dangling use cases may have a periodic motion component. It may be desirable to remove or reduce components of the navigation solutions that may be ascribed to this oscillation. By employing all of the navigation solutions derived over the first time period, a zero-phase low pass filter can be utilized to remove or reduce the effect of the oscillations without introducing unwanted delay into the signals.

In another aspect, it may be desirable to detect one or more navigation solutions that may be associated with a type of motion that may influence the use of the information during global shape matching. For example, patterns of motion may be detected during certain periods that indicate the device is undergoing non-meaningful motion, such as a user fidgeting with the device. Further, information before and after such periods may be used to improve the identification of non-meaningful motion. In some embodiments, a detected non-meaningful motion period may be used for tracking misalignment to isolate an unintended misalignment change during the non-meaningful motion period. In some embodiments, a detected non-meaningful motion period may be used for compensating the detection of steps in pedestrian dead reckoning techniques, in which the non-meaningful motion may result in the incorrect detection of steps.

Derivation of the navigations solutions used to estimate the trajectories may use any one or combination of filters to make position determinations, including without limitation Kalman filters, unscented Kalman filters, particle filters and the like. Different system and measurement models can be also used according to the applications, for example: prediction only, near constant velocity and others. These models may employ different techniques to propagate the position of portable device 100 and to use navigation solution outputs as measurement updates.

Additionally, one or more smoothing passes may be performed in conjunction with forward and/or backward processing the motion sensor data. Input data may also be included from other sources when available, such as absolute navigation information, models of user dynamics (e.g., step length estimation), characteristics of sensor performance (e.g.), supplemental sensor data and others. The navigation solutions used to derive the user trajectory may include any suitable information related to the position, motion and/or orientation of portable device 100. For example, a navigation solution may include position, velocity and attitude, position and attitude, position and velocity, position and speed, attitude alone or other combinations of these quantities.

Generally, forward and backward processing of the input data may be performed to derive the forward and backward trajectories as noted above. One or more quantities of the navigation solutions used to estimate the trajectories may be combined to smooth the quantities. Further passes of forward and backward processing may be performed as desired using quantities of the navigation solution that were combined to further enhance the navigation solutions. Moreover, merging the forward and backward trajectories may involve a smoothing operation. Backward processing may also be helpful for a long trajectory when positioning information toward the end of the trajectory is available, such as from an anchor point like a checkout point or store exit. A backward processed navigation solution may significantly reduce the accumulated error that may otherwise occur. Additionally, more reliable misalignment estimates may be obtained. Further details regarding forward and backward processing and smoothing operations that may be performed are described in co-pending, commonly-assigned U.S. patent application Ser. No. 15/054,792, as incorporated above.

Once a suitable trajectory has been estimated, either as a merged trajectory or as one of a forward and backward trajectory, the global shape matching techniques of this disclosure may be used to derive a solution path in the map information having a shape that optimizes the resemblance to the estimated trajectory. As will be discussed in further detail below, the map information for the environment encompassing the trajectory may be represented as a grid map, formed by a group of nodes that are connected to each other with links. A trajectory on such a grid map may be represented by a sequence of nodes and their connecting links. Mathematically, these may be treated as a series of vectors. Thus, to facilitate the global shape matching of the estimated trajectory to the map information, the estimated trajectory may be represented as a set of connected vectors by applying a vectorization operation as indicated by 408 in FIG. 4 or 522 in FIG. 5, for example. This allows ready comparison of the shape of the estimated trajectory to the map information, as both may be represented in the same manner.

Generally, vectorization of the estimated trajectory may involve generating a two dimensional piecewise linear approximation to the shape of the trajectory. As will be appreciated, a number of techniques as known in the art may be employed. For example, an initial possible approximation may be established and then refined by dividing and merging segments together until suitable error criteria are satisfied. Another example is to connect points on the trajectory with local maximum k-curvature.

To help illustrate, the vectorization of an estimated trajectory may involve finding the minimum number of vectors that approximate the shape of the estimated trajectory, such that the error between the estimated trajectory and the vectorized trajectory solution is below a suitable threshold. The heads and tails of all vectors of the vectorized trajectory may be constrained to be on the curve of the estimated trajectory. Accordingly, the vectorized trajectory may be fully defined by selecting a set of points on the estimated trajectory and connecting them to from a set of connected vectors representing the estimated trajectory. Notably, the estimated trajectory $S_m$ may be a set of points $P_i$ as indicated in Equation (8), where N is the total number of points in the merged solution and $x_i$ and $y_i$ are the x and y coordinates of the point $P_i$:

$$P_i = \{(x_i, y_i) | 0 \leq i \leq N\} \tag{8}$$

Correspondingly, the vectorized trajectory may be defined by Equation (9), where $v_j$ is a mapping subscript that indicates that the $j^{th}$ point on the vectorized trajectory is the $v_j^{th}$ point in the estimated trajectory:

$$0 = v_0 < v_1 < v_2 < \ldots < v_n = N \tag{9}$$

It should be noted from the above equations that the start and the end points of the estimated trajectory are included in the vectorized approximation. The $j^{th}$ vector in the vectorized approximation is defined to be the line segment joining the points $P_{v_{j-1}}$ and $P_{v_j}$, and thus may be represented with the notation $\overline{P_{v_{j-1}}, P_{v_j}}$. Correspondingly, the vectorized trajectory $S_v$ may be defined to be the set of all n line segments, as indicated in Equation (10):

$$S_v = \{\overline{P_{v_0}, P_{v_1}}, \overline{P_{v_1}, P_{v_2}}, \overline{P_{v_2}, P_{v_3}}, \ldots, \overline{P_{v_{j-1}}, P_{v_j}}, \ldots, \overline{P_{v_{n-1}}, P_{v_n}}\} \tag{10}$$

For all the points $P_k$ on the estimated trajectory lying between $P_{v_{j-1}}$ and $P_{v_j}$ the error $e(P_k)$ may be defined to be the shortest distance between the point $P_k$ and the line segment $\overline{P_{v_{j-1}}, P_{v_j}}$, as given by Equation (11), where dist is a function that finds the shortest distance between a point and a line segment:

$$e(P_k) = \text{dist}(P_k, \overline{P_{v_{j-1}}, P_{v_j}}), \forall P_k : v_{j-1} \leq k \leq v_j \tag{11}$$

The error in the segment $\overline{P_{v_{j-1}}, P_{v_j}}$ may be defined to be the maximum error of all points $P_k$ lying on the estimated trajectory between $P_{v_{j-1}}$ and $P_{v_j}$ according to Equation (12):

$$e(\overline{P_{v_{j-1}}, P_{v_j}}) = \max_{v_{j-1} \leq k \leq v_j}(e(P_k)) \tag{12}$$

The error of the vectorized trajectory $S_v$ may also be defined as the maximum of the error of all of its segments according to Equation (13):

$$e(S_v) = \max_{0 < j \leq n}(\overline{P_{v_{j-1}}, P_{v_j}}) \tag{13}$$

Following the above, vectorization of the estimated trajectory may involve finding $S_v$ such that the number of segments n is minimal and $e(S_v) < \in$, where $\in$ is a maximum tunable threshold for the error. One suitable technique for minimizing the number of segments may employ a dynamic programming approach. For example, given a point on the estimated trajectory with the index q, C(q) may be defined as the set of all indices r>q such that $e(\overline{P_q, P_r}) < \in$. Equation (14) may be established by setting F(q) to be the minimum number of segments required to approximate the part of the estimated trajectory from $P_q$ to $P_N$:

$$F(q) = \min_{r \in c(q)} 1 + F(r) \tag{14}$$

As will be appreciated, this recursive formula may be employed for a dynamic programming approach, with base cases F(N)=0 and F(N−1)=1. By evaluating the function C(q) for all points of the estimated trajectory, the vectorized trajectory may be constructed from the second position to the first position. Starting with the base case, for each point the index r with minimum F(r) in the set C(q) may be tracked. Since, C(q) is always greater than q by definition, starting from the second position and progressing to the first position may ensure that the function F has been calculated for all points in C(q) before reaching the point with index q.

Figure 9:
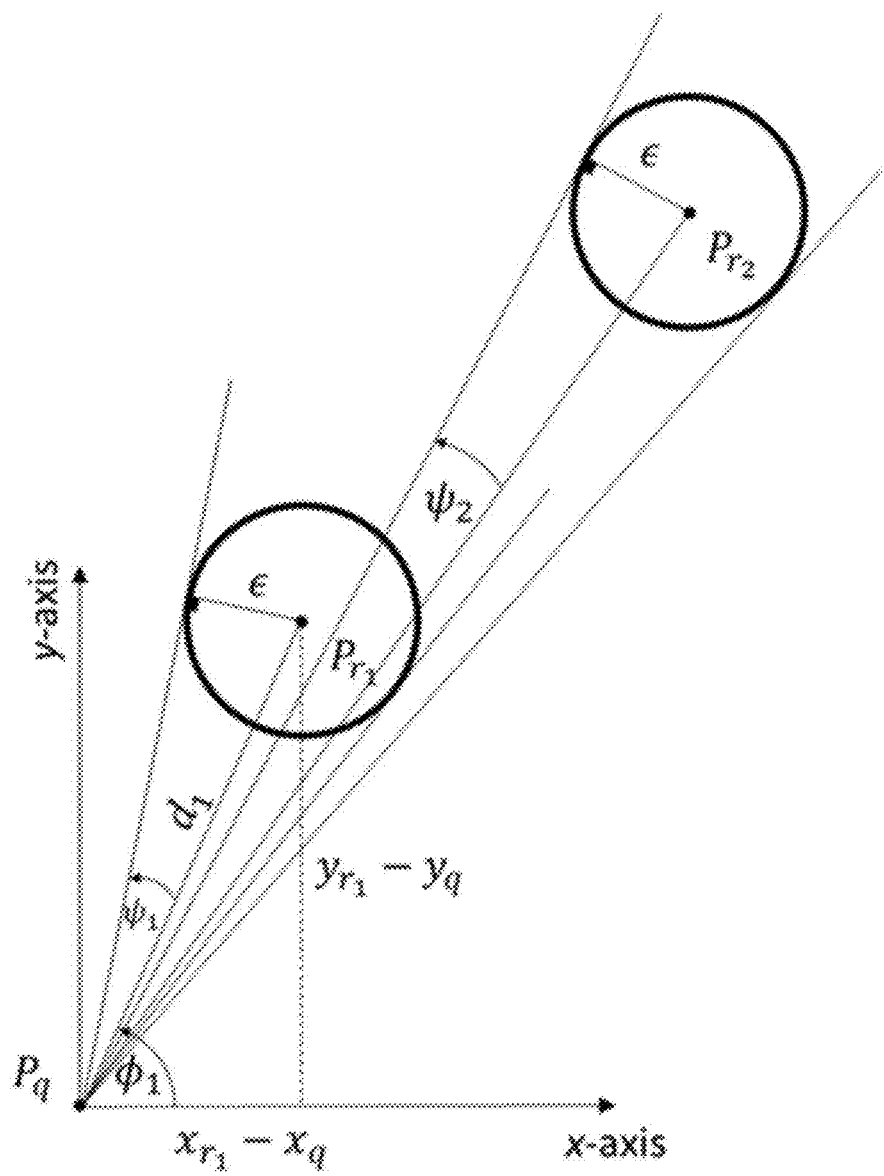
FIG. 9 is a schematic representation for determining connectable points when vectorizing a trajectory according to an embodiment.

Next, a suitable algorithm may be applied to find the function C for any given point index q on the estimated trajectory. As discussed above, the function C(q) finds all the points with indices r>q that can be connected to the point $P_q$ such that the line segment $\overline{P_q, P_r}$ satisfies the condition $e(\overline{P_q, P_r}) < \in$. To obtain these points, a coordinate system centered at the point $P_q$ may be defined. As shown in FIG. 9, the error may be represented as a circle of radius E with two tangent lines that intersect at $P_q$ for the first point after $P_{r_1}$. The area enclosed between these lines defines a local domain of lines to which the vectorization line should belong if the error threshold condition is to be satisfied. In other words, the area between the two lines define the domain of C(q). The next point $P_{r_2}$ may similarly be represented as a circle of radius $\in$ to define a new local domain with tangent lines following the approach discussed with respect to point $P_{r_1}$. Now it may be seen that the domain of C(q) becomes the intersection between the local domain defined in $P_{r_1}$ and that defined in $P_{r_2}$. If there is no intersection, that means that $r_2$ cannot be included in C(q) and the routine may end.

Quantitatively speaking, the local domain of a point $P_{r_1}$ may be defined as Equations (15)-(17). In particular, the angle of the line joining $P_q$ and $P_{r_1}$ may be expressed as Equation (15):

$$\phi_1 = \tan^{-1} \frac{y_{r_1} - y_q}{x_{r_1} - x_q} \tag{15}$$

The angle between this line and each of the tangents may be expressed as Equation (16), where d is the distance between $P_q$ and $P_r$ given by Equation (17):

$$\psi_1 = \sin^{-1} \frac{\epsilon}{d_1} \tag{16}$$

$$d = \sqrt{(x_{r_1} - x_d)^2 + (y_{r_1} - y_q)^2} \tag{17}$$

These equations indicated the slope of any vectorization line passing through $P_q$ should be in the range $R_1 = (\phi_1 - \psi_1, \phi + \psi_1)$ to satisfy the error condition. Similarly, the range for the point $P_{r_2}$ may be $R_2 = (\phi_2 - \psi_2, \phi_2 + \psi_2)$.

To satisfy both error conditions, the approximating segment should be in the intersection range $I_2 = R_2 \cap R_1$. A general definition for $I_i$ may be given by Equation (18):

$$I_i = \cap_{j=1}^{i} R_j = [\theta_{min}(i), \theta_{max}(i)] \tag{18}$$

Correspondingly, $\theta_{min}(i)$ and $\theta_{max}(i)$ may be calculated recurrently using Equations (19) and (20):

$$\theta_{min}(i+1)=\min((\max(\theta_{min}(i),\phi_{i+1}-\psi_{i+1})),\theta_{max}(i)) \quad (19)$$

$$\theta_{max}(i+1)=\max((\min(\theta_{max}(i),\phi_{i+1}+\psi_{i+i})),\theta_{min}(i)) \quad (20)$$

From the above, it may be determined for a point of index q, all successive indices belong to C(q) until the interval $(\theta_{min}, \theta_{max})$ becomes $\Phi$.

Figure 10:
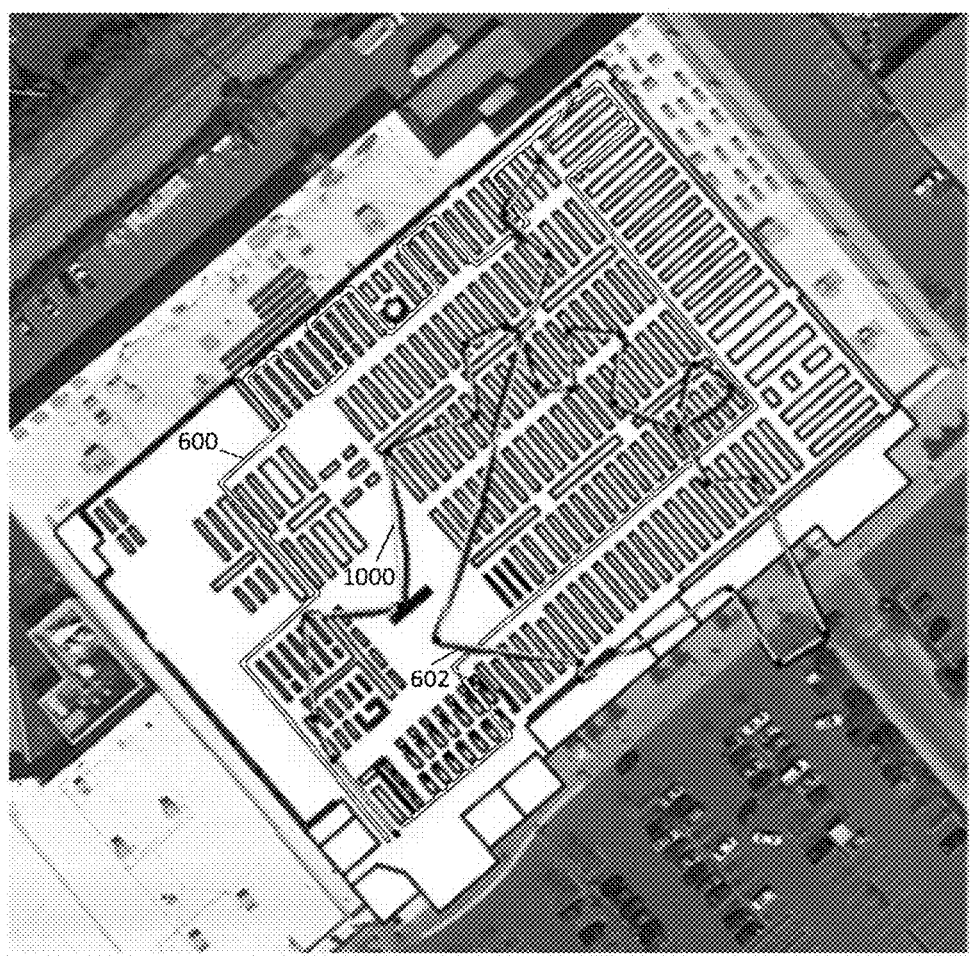
FIG. 10 is a schematic representation comparing a reference trajectory to a vectorized forward trajectory according to an embodiment.
Figure 11:
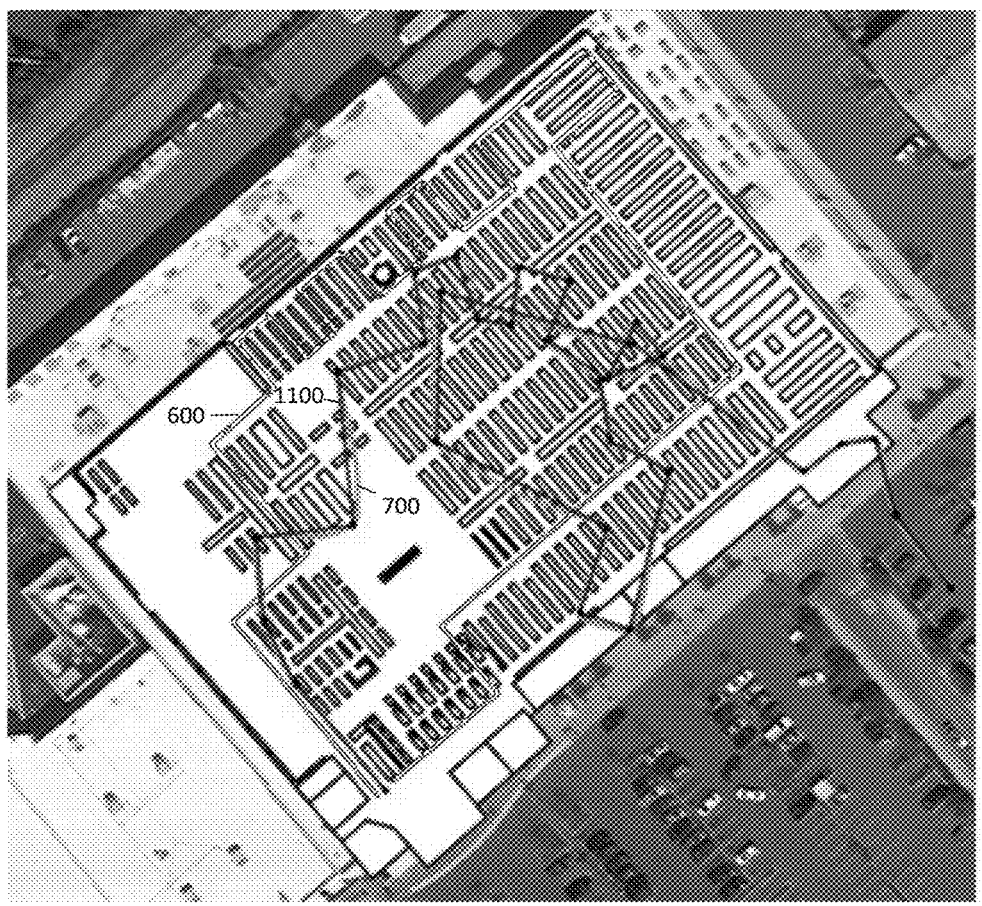
FIG. 11 is a schematic representation comparing a reference trajectory to a vectorized merged trajectory according to an embodiment.

An example of the above vectorization technique is depicted in FIG. 10, showing the reference as outline trace 600 and forward trajectory as black trace 602 from FIG. 6, along with the set of connected vectors representing the forward trajectory, indicated using grey trace 1000. The set of points $P_i$ used to derive the vectors are depicted as black dots on the forward trajectory trace. In this view, grey trace 1000 has been superimposed over forward trajectory trace 602 and therefore obscures portions of it. Likewise, another example of vectorization is depicted in FIG. 11, showing the reference as outline trace 600 and the merged trajectory as grey trace 700 from FIG. 7, along with the set of connected vectors representing the merged trajectory, indicated using black trace 1100. The set of points $P_i$ used to derive the vectors are depicted as black dots on the merged trajectory trace, portions of which are obscured by the superimposition of black trace 1100.

If desired, an additional operation that may be performed during vectorization is to compare all adjacent vectors and combine any two successive vectors when the difference between their angles is below a certain threshold. This optional step may reduce the ambiguity during the global shape matching.

Following vectorization of the estimated trajectory, an optimization may be performed to provide a global shape match of the estimated trajectory to the map information as indicated by 412 in FIG. 4 or 526 in FIG. 5, for example. Correspondingly, an input for the optimization is map information for the environment encompassing the trajectories. Map information may initially be obtained from any suitable source, such as from on-line map service providers. As necessary, the map information may be preprocessed into a form suitable for the global shape matching techniques, such as by creating a grid map as noted above. On-line indoor/outdoor map service providers may provide web Application Programming Interfaces (APIs) to access their map database. Accordingly, the corresponding APIs from the map provider may be used to obtain map information for an area encompassing the user's current location. Particularly notable examples of venues that may have corresponding map information include indoor environments such as office buildings, hospitals, malls, conference centers exhibitions, retail stores and the like. For example, the information may be decoded to extract the necessary map data used for techniques of this disclosure using the APIs and converted into a unified format such as the Geographic Javascript Objective Notation (GeoJson) format, although xml files, binary files and others may be used. More details regarding maps and grid maps may be found in the materials below.

Some map features or entities may also provide inherent position information, such as elevators, escalators, stairs that may be associated with level change scenarios or conveyors that may allow the assumption of heading or other position information. The locations of the entrances and exits within environment, such as doors or the like, may also provide position information. Still further, the direction of the entrances/exits may also be used when determining initial or final headings. In a multi-level venue, the height of each level may be used with sensor information indicating changes in elevation to help determine when a level change scenario may exist. Notably, such position information may be used when establishing boundaries such as the first and/or second position of the trajectory.

Figure 12:
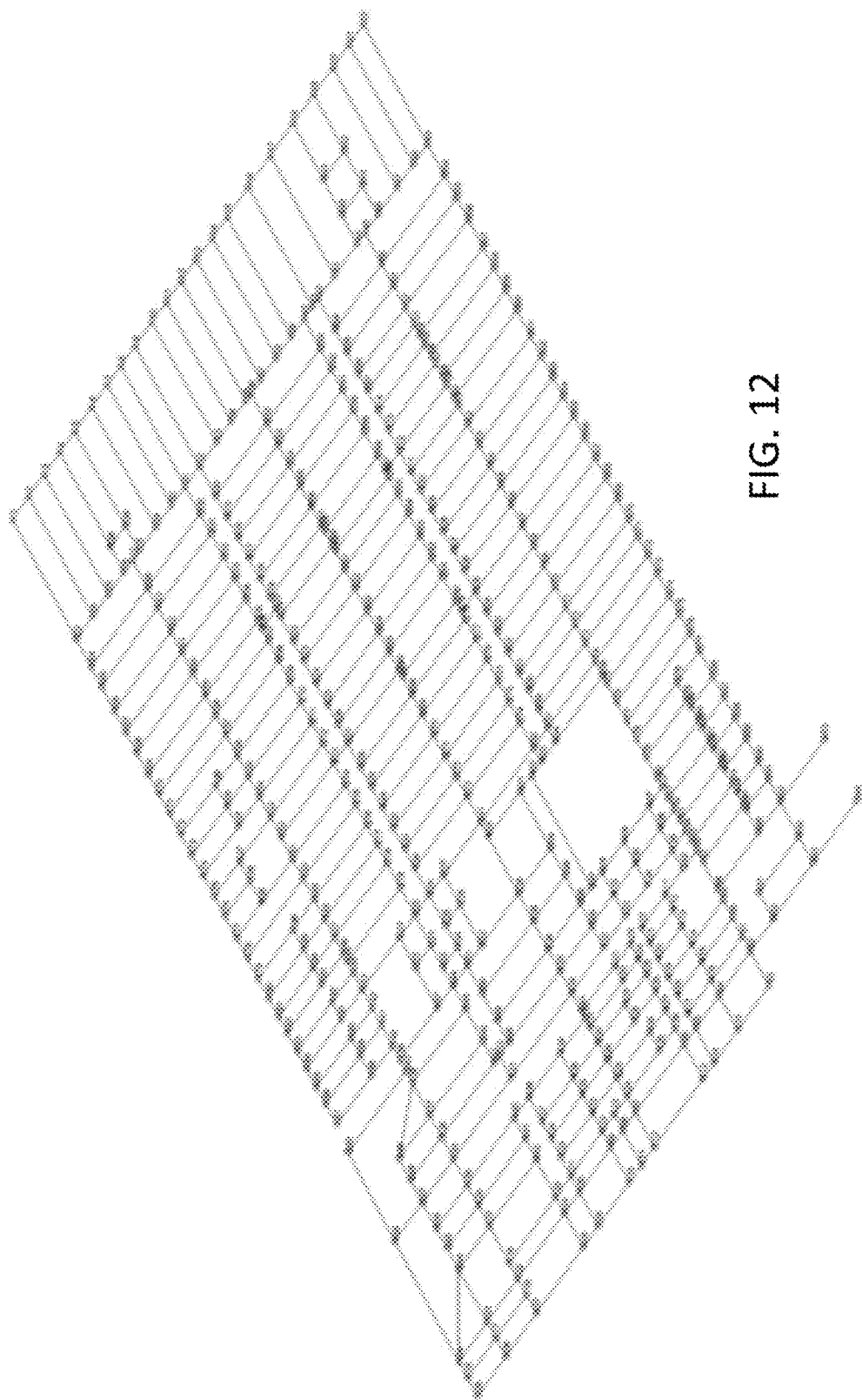
FIG. 12 is a schematic representation of grid map according to an embodiment.

According to the techniques of this disclosure, map information may be an abstraction of the traversable areas of the environment represented as connected links and nodes in a grid map as discussed above. One example of a grid map that corresponds to the environment encompassing the trajectories shown in FIGS. 6-8, 10 and 11 is depicted in FIG. 12. In this representation, the nodes are shown as open circles and the links as connecting lines.

In order to optimize the global shape matching of the vectorized estimated trajectory to the map information, a suitable cost function may be implemented to mathematically measure the resemblance or difference between the vectorized trajectory (the set of connected vectors) and the potential matches from links between nodes of the grid map. The aim is to find $\theta$a solution path with best cost (i.e. least difference and most resemblance). The solution path may be considered a trajectory derived by connecting nodes and links of the map information. In one embodiment, the cost function may evaluate a "distance" between the vectorized trajectory and the solution path, in order to derive a solution path that minimizes the distance. In the context of applying this cost function, the term "distance" may be taken as measuring how different the two trajectories are from each other. Correspondingly, each trajectory may be viewed as a series of vector lengths and the relative angles between them. The distance between two trajectories may be measured based on the difference between each two corresponding lengths and relative angles.

The global shape matching of the estimated trajectory to the map information may be considered as deriving a solution path on the map between the first position and the second position while minimizing the cost function, which may be solved mathematically as an optimization problem. The grid map shown in FIG. 12 is represented by a graph data structure, but may constitute an undirected cyclic graph, that may result in infinitely many possible paths between the first position and the second position to evaluate with the available computing resources. In some embodiments, the cyclic graph can be converted into a directed acyclic graph (DAG) to enable globally solving this problem, as described in the following materials, without a separate step that explicitly generates infinitely many possible solution paths.

During the vectorization operation, the estimated trajectory was approximated by a series of successive vectors $\{V_0, V_1, V_2, \ldots, V_i, \ldots, V_{n-1}\}$, where n is the total number of vectors in the vectorized trajectory. The vectorized trajectory may be fully described by the set of lengths of the vectors $\{d_0, d_1, d_2, \ldots, d_i, \ldots, d_{n-1}\}$ along with their corresponding slopes $\{\theta_0, \theta_1, \theta_2, \ldots, \theta_i, \ldots, \theta_{n-1}\}$. The head of each vector meets the tail of the next vector at a node. Nodes in the vectorized trajectory are given the symbols $\{N_0, N_1, N_2, \ldots, N_i, \ldots, N_n\}$. To match the vectorized trajectory to the map information, nodes on the vectorized trajectory may be matched to nodes on the map. Correspondingly, evaluating the possibilities to provide the desired global shape match optimization, the map information may be represented as a DAG.

Figure 13:
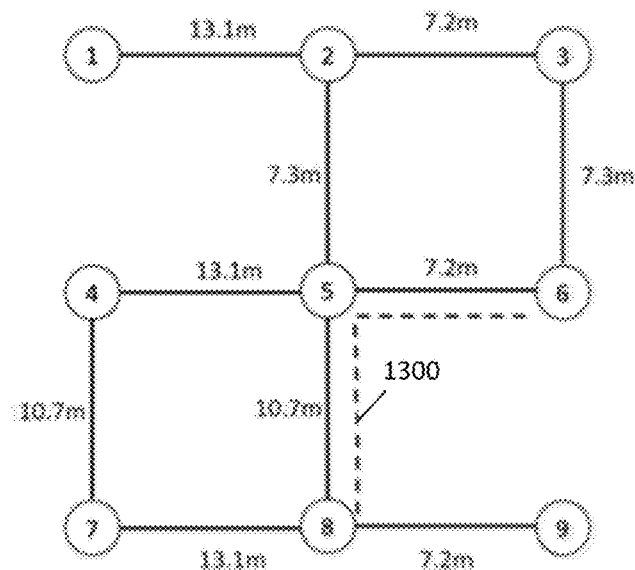
FIG. 13 is a schematic representation of a graph data structure of map information according to an embodiment.

To provide a simplified example that clarifies the relevant operations, the following materials describe the process of building a DAG for a hypothetical trajectory of four nodes to be matched with a grid map of 9 nodes. A suitable graph data structure representing the 9-node map information is depicted in FIG. 13. Nodes are indicated by the numbered open circles, while links are indicated by the connecting lines. The weight on each link represents the Euclidian distance between the connected nodes. A reference trajectory is indicated by dashed trace 1300, and as seen may begin at a first position of node 8, travel forward to node 5, making right-hand turn and progress to the second position at node 6. In turn, a 4-node hypothetical trajectory, such as may be estimated from motion sensor data, is represented by black trace 1400 in FIG. 14. The vectorized trajectory approximation is also shown as the set of points indicated by the black dots on trace 1400 and the connecting straight lines.

Figure 14:
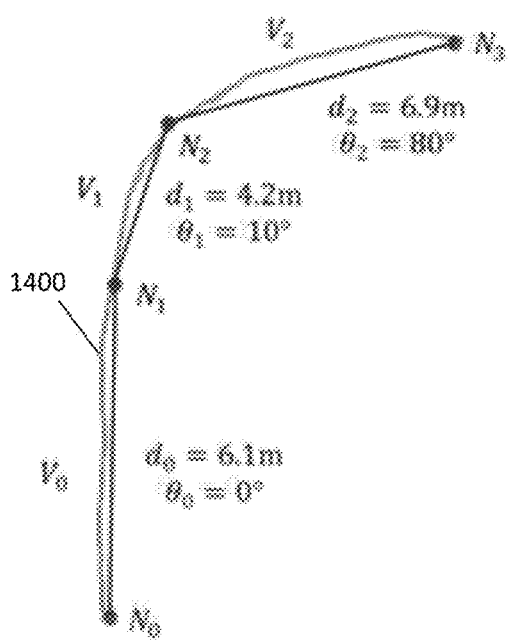
FIG. 14 is a schematic representation of a vectorized estimated trajectory for matching to the graph data structure of FIG. 13 according to an embodiment.
Figure 15:
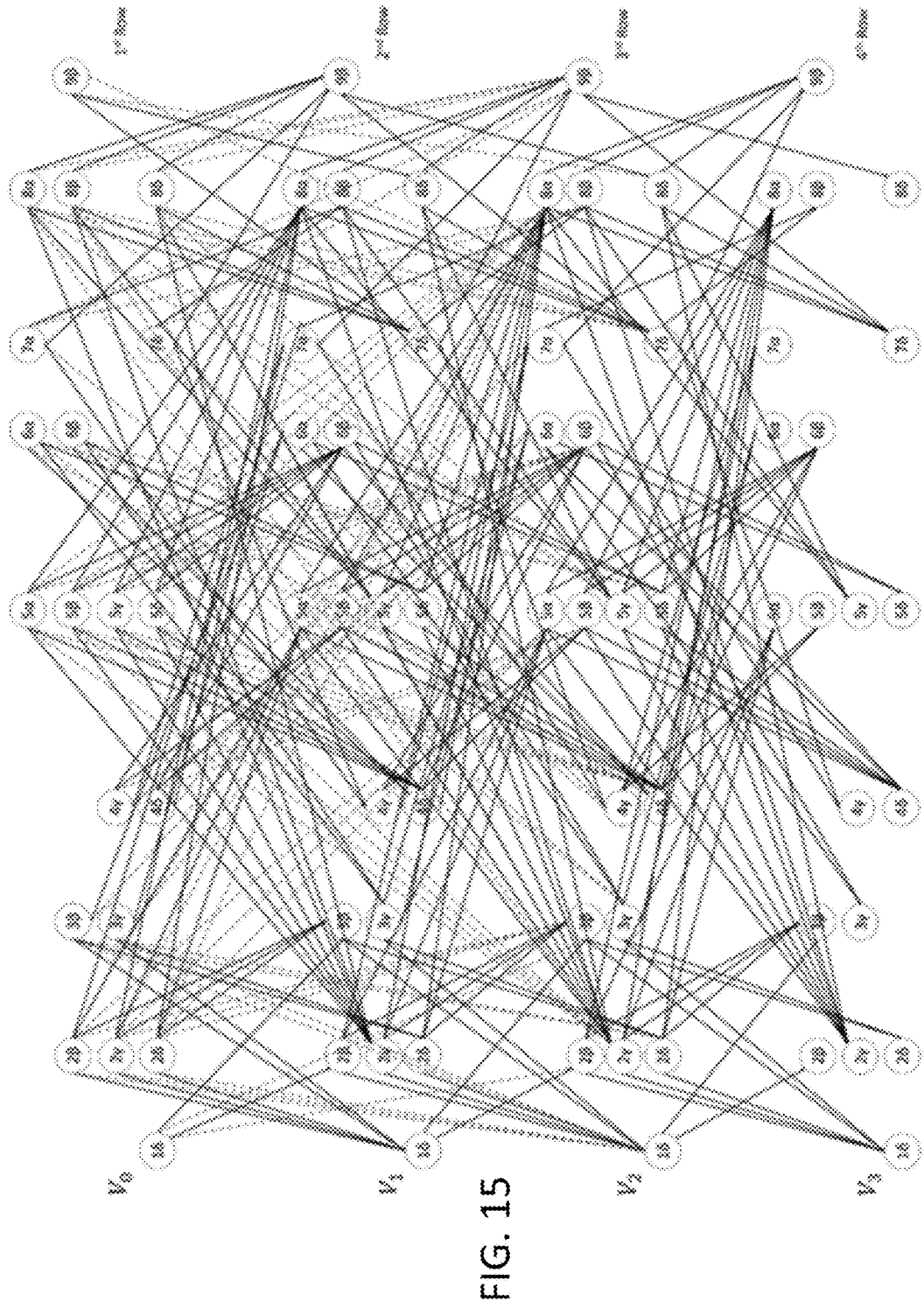
FIG. 15 is a schematic representation of a directed acyclic graph constructed from FIGS. 13 and 14 according to an embodiment.
Figure 16:
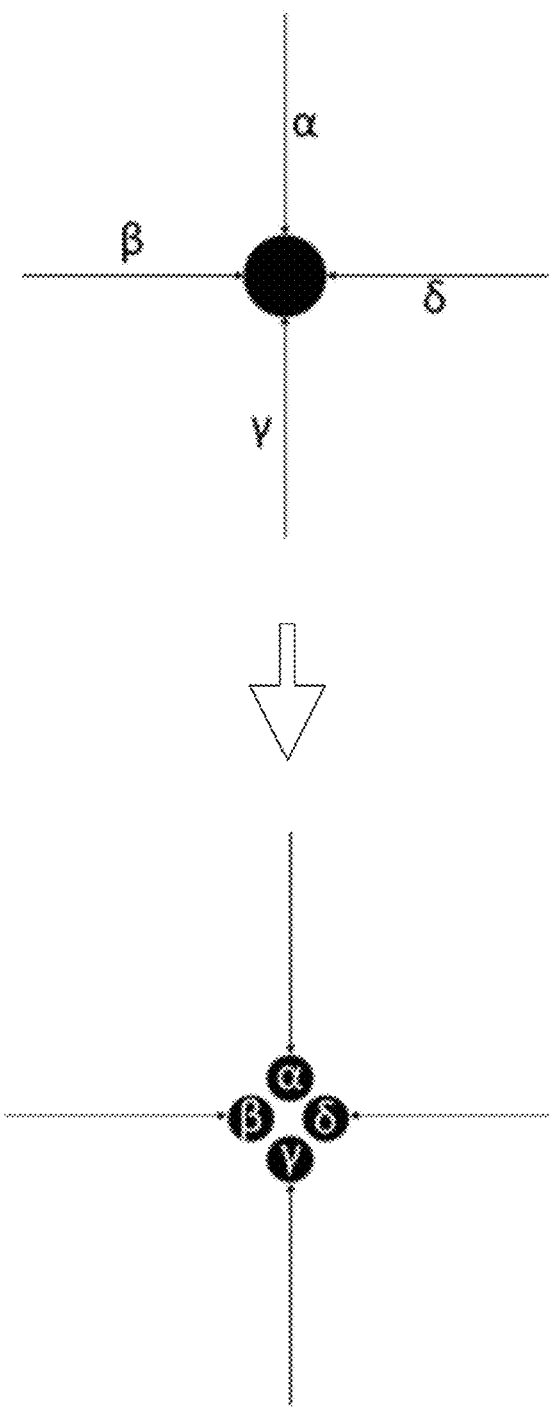
FIG. 16 is a schematic representation of incoming angle designation for a node of a grid map according to an embodiment.

From the map information of FIG. 13 and the vectorized trajectory of FIG. 14, a DAG may be constructed to perform the global shape matching as shown in FIG. 15. Each node in the vectorized trajectory corresponds to a row in the DAG, so that the number of rows in the DAG equals the number of nodes in the vectorized trajectory. Further, each row in the DAG contains all the nodes of the grid map. Evaluation of the resemblances between the vectorized trajectory and a trajectory on the map may be performed by comparing relative angles between links. Therefore, the angle of the incoming link to each node may be used when applying the cost function. For example, reaching a node from the right is a completely different case than reaching it from the left, and the two cases may be evaluated separately. As may be appreciated, for a given row in the DAG, a node in the grid map may appear more than once due to consideration of the angle of the incoming link. Each node in the DAG of FIG. 15 has a number and a Greek letter. The number indicates the grid map node that corresponds to this DAG node while the letter indicates different possibilities of incoming angles to the node on the grid map. It should be noted that the Greek letter may not translate to a certain incoming angle but it can be just to identify different possibilities of reaching the node from different directions. The exact incoming angle to each node in the DAG may be identified from the grid map. To illustrate, FIG. 16 shows how a single node in the grid map with four incoming links may be represented by four nodes in the DAG, one corresponding to each incoming angle. Returning to the context of FIG. 15, it may be appreciated that node 1 is always connected to node 2β because it is to the left of node 2 whereas node 3 is connected to node 2δ because it is to the right of node 2.

Further, for each node in the grid map, a set of nodes termed "neighboring nodes" may be defined as the set of nodes that are reachable by a straight line on the grid map from that node. Moreover, a straight line on the grid map includes one or more collinear successive links. This definition account for the observation that a plurality of successive collinear links on the grid map may correspond to a single vector in the vectorized trajectory. For example, in the grid map of FIG. 13, the set of neighboring nodes for node 2 are nodes 1, 3, and 5, each of which is directly connected by a single link, as well as node 8, which is reachable by two successive collinear links. In the DAG, nodes in one row are not connected to nodes from the same row or to nodes from a preceding row. Connecting two rows in the DAG means that every node in the preceding row is to be connected to its neighboring nodes in the successive row with directed links. When constructing the DAG, each row is connected to the one next to it. A row can also be connected to rows after the next to represent the possibility of bypassing a node in the vectorized trajectory. For example, a node in the vectorized trajectory may be bypassed if the node separates two vectors in the vectorized trajectory that are nearly collinear or if it is a part of some noise in the trajectory. In the sample trajectory shown in FIG. 14, vectors $V_0$ and $V_1$ are nearly collinear. When deriving the solution path, they may be taken as matching a single link on the DAG that connects node 8 to node 5. In the DAG shown in FIG. 10, the $1^{st}$ row is connected to the 3rd row to account for this case, with the corresponding links indicated by dashed lines. In one embodiment, a node $N_i$ may be considered to be bypassable if the difference between the slope of the vectors $|\theta_1 - \theta_{i-1}|$ is within a certain threshold or if it is a part of very short vectors whose lengths are below a certain threshold $\in_d$ i.e. $d_i < \in_d || d_{i-1} < \in_d$. An optional aspect of the vectorization as discussed above is to combine two successive vectors having close directions. The hypothetical trajectory in FIG. 14. provides an illustration of this operation, as $V_0$ and $V_1$ may be combined and matched together to a single link on the map shown in FIG. 13 (the link between nodes 8 and 5) if difference between their angles is within a certain threshold.

Next, each link in the DAG may be given a weight which represents the cost of matching its end nodes to the corresponding nodes in the vectorized solution. As will be appreciated, this cost represents how similar the link connecting the map nodes is to the link that connects the corresponding nodes of the vectorized trajectory. The relative angle of any link may be defined as the difference between its slope and that of its preceding one. Accordingly, a suitable cost function may employ a parameter representing the difference between the length of the link in the grid map and the length of the link on the vectorized trajectory (Δd) and a parameter representing the difference between the relative angle of the link in the grid map and the relative angle of the corresponding link in the vectorized solution (ΔΘ$_r$), where the relative angle of a link in either the vectorized solution or the DAG is the difference between its angle and the angle of its predecessor. As with the vectorization optimization, the cost function may be expressed in a number of suitable forms. In exemplary embodiments, the cost function may be linear as given by Equation (21), quadratic as given by Equation (22), or a combination of both, where a and b are tunable parameters:

$$f(\Delta d, \Delta\theta_r) = a^* |\Delta d| + b^* |\Delta\theta_r| \tag{21}$$

$$f(\Delta d, \Delta\theta_r) = a^* (\Delta d)^2 + b^* (\Delta\theta_r)^2 \tag{22}$$

For the sample trajectory shown in FIG. 13, these principles may be illustrated by employing a quadratic cost function having tunable parameters a and b of 1000 and 1, respectively, to select a cost function according to Equation (23):

$$f(\Delta d, \Delta\theta_r) = 1000^* |\Delta d| + |\Delta\theta_r|$$

Correspondingly, the cost of the link that joins node 9β on the $3^{rd}$ row to node 8δ on the $4^{th}$ row may be calculated using Equation (23). Since the link is connecting the $3^{rd}$ row to the $4^{th}$ row, the distance on the vectorized trajectory is that between the $3^{rd}$ and the $4^{th}$ nodes, which is $d_2$=6.9 m. The distance on the grid map is that between node 9 and node 8, which is 7.2 m, allowing Δd to be calculated 7.2 m—6.9 m=0.3 m. Node 9β indicates that the incoming link is from the left, and continues on to node 8, forming a relative angle of 180°. In the vectorized trajectory, the relative angle θ$_r$ may be calculated as $\theta_2 - \theta_1 = 80° - 10° = 70°$, so that ΔΘ$_r$ may in turn be calculated as 180°−70°=110°. Therefore, Equation (23) may be rewritten as Equation (24), with the calculated values substituted for Δd and ΔΘ$_r$:

$$f(\Delta d, \Delta\theta_r) = 1000^* |0.3| + |110| = 410 \tag{24}$$

Any path on the DAG that starts at the start node and ends at the end node may be considered a possible match to the vectorized trajectory. The total cost of a certain path is the summation of the weights of its links, representing how similar the path on the map is to the vectorized trajectory. After calculating the weight of each link on the DAG, the global shape matching may involve finding a path that has the minimum total cost through the application of a suitable shortest path algorithm. As will be appreciated, shortest path problems are well known in the art.

One example of an algorithm having reasonable complexity that may be used to perform the global shape matching optimization is Dijkstra's algorithm. Returning to the DAG of FIG. 15, constructed from the grid map and sample trajectory of FIGS. 13 and 14, one of the nodes in the $1^{st}$ row that may be selected as corresponding to the first position on the grid map is given a weight of zero, while each remaining node on the DAG may be given an initial weight of infinity (the largest possible number). Any incoming angle may be used when selecting the node corresponding to the first position as the incoming angle to the node has no meaning for the first position, since it represents the start of the trajectory. Each row of the DAG may be processed successively. For each row, all nodes included in the row are processed. If the weight of the node is infinity, the node is skipped and if not, all links branching from the node are processed. For any link on the DAG, the node at which it starts may be termed the source node and the node at which it ends may be termed the destination node. The sum of the weight of the source node and the link may be computed, and if less than the weight of the destination node, the weight of the destination node may be set to the computed sum. Further, a parent of the destination node may be set to be the source node. Correspondingly, the parent of each node is its predecessor in the optimal path that goes from the starting node to that node. By processing the rows one by one, it may be ensured that after every node has been reached, every possible path starting from the starting node to that node has already been evaluated and the cost function minimized. Likewise, after processing all the nodes, a solution path connecting the first position to the second position may be derived in a backwards direction by starting at the node for the second position and selecting its parent, and then the parent of the parent (grandparent), repeating until the node for the first position is reached.

Figure 17:
FIG. 17 is a schematic representation comparing representation comparing a reference trajectory to a solution path derived by global shape matching according to an embodiment.

For the sample trajectory, the cost of every link in the DAG shown in FIG. 15 may be calculated as described above. Knowing that the node corresponding to the first position is 8 and the node corresponding to the second position is 6, the shortest path on the DAG may be determined to be the trajectory from node 8 in the $1^{st}$ row, through node 5γ in the $3^{rd}$ row, and reaching node 6β in the $4^{th}$ row. Visually, it may be appreciated that the shape of the estimated trajectory closely matches the derived solution path. A further illustration of these techniques is given in FIG. 17, in which the above approach has been applied to the vectorized merged trajectory of FIG. 11 to provide a global shape match to the map information of FIG. 12. As shown, the derived solution path indicated by black trace 1700 mirrors the reference trajectory indicated by outline trace 600. In this view, the reference trajectory has been superimposed over the solution path and obscures those portions that are overlapped. Correspondingly, it may readily be appreciated that the solution path provides a more accurate estimate of the reference trajectory than any of the sensor only based trajectories.

In a further aspect, device 100 may have a source of absolute navigation information 122 as noted above. This represents information independent of the motion sensor data and map information which may be used to influence the global shape matching of the estimated trajectory. When a position determination based on absolute navigation information is available, it may be established as an anchor point having a location that may be represented in relation to the map information and may also have an accurate time tag. Some examples of absolute navigation information may be those derived from GNSS positioning, WiFi positioning, beacon or Bluetooth based positioning, magnetic fingerprint positioning, visible light communication (VLC) based positioning and others. When employing absolute navigational information, such as obtained in these manners, two possibilities exist: (a) the absolute navigational information may be integrated with the navigation solution from sensors and used to derive the estimated trajectory that will be vectorized before the global shape matching; and (b) the absolute navigational information may not be pre-integrated with the navigation solution and its estimated trajectory that will be vectorized, but may be integrated during the global shape matching operation as part of that operation. The choice between the options (a) and (b) above may depend on the application and its nature. Another example of anchor points or absolute navigation information (in the form of anchor point), such as in retail applications, is that one or more anchor points may be obtained or otherwise identified from point of sale information, which may include a list of items a user has purchased while traversing the trajectory. A suitable database from a third party or the retailer may correlate each item with a specific location in the environment, in this case it can be used as an anchor point with known position/location. In some situations, an anchor point derived from point of sale information may have a time tag, but in other situations, there may be no indication when the user was at the locations associated with the purchased items. Nevertheless, such anchor points may still be used when performing the global shape matching, as it may be expected that the solution path should pass through the locations at some point. As another example, device 100 may be used to run an application that involves scanning or otherwise interacting with items, such as an application provided by the retailer (one example may be to scan bar-codes of products). Upon scanning, the product location database may be queried to get a position for that item scanned and a time tag may be established. For the case of anchor points derived from point of sale in the retail example mentioned earlier, there are two further cases: (i) if the user ID is known on the portable device used or if a loyalty program is used by the user on that device, then the set of point of sales is fully known for that user; and (ii) if the if the user ID is not known on the portable device used and if a loyalty program is not used by the user on that device, then the set of point of sales is not directly known for that user but it may still be associated to the user through other techniques. In this latter case, further details regarding the use of anchor points derived from point of sale information and their association to trajectories from users may be found in co-pending, commonly owned U.S. patent application Ser. No. 15/258,906, filed Sep. 7, 2016, entitled "METHOD AND SYSTEM FOR ASSIGNING POINT OF SALE INFORMATION," which is hereby incorporated by reference in its entirety.

In one embodiment, the anchor points may be applied deterministically to ensure the trajectory has passed through the associated locations. As will be appreciated, such anchor points may be used to constrain the optimization. For example, the shortest path algorithm may be recast as a constrained shortest path algorithm, often referred to in the literature as the "sales man" problem. Correspondingly, the rows and nodes of the DAG may be processed to derive the shortest path that passes through all anchor points starting from the first position and ending at the second position. When the anchor points have a time tag, the constraint may be more strict. By employing the time tag for a given anchor point, a correspondence may be found with a single vector of the vectorized solution. As such, a set of possible corresponding links on the DAG may be specified, so that the solution path on the DAG may be constrained to a trajectory that passes through one of the set of corresponding links.

While the deterministic approach described above may be desirable when there is reasonable confidence in the anchor points, in other situations there may be a degree of error associated with one or more of the anchor points. Since constraining the solution path to an erroneous anchor point may degrade the accuracy, a different approach may be followed. Rather than using the anchor points as constraints, they may be accommodated using the cost function. For example, a negative cost may be added to links on the DAG that correspond to anchor points. Correspondingly, the solution path will only be attracted to links with anchor points rather than being forced to pass through them. Additionally, if the degree of uncertainty regarding an anchor point may be quantified, this value may be used to weight the negative cost added. As such, anchor point having more certainty may have a corresponding higher magnitude in their negative cost. The magnitude of the negative cost added to the link influences the degree to which the solution path incorporates the anchor point.

In some implementations, an anchor point may be so far from the actual trajectory that a determination may be made that the anchor point may be in error. Different approaches may be used to address this situation as warranted. As one example, the anchor point may function as a "prize" on the DAG that reduces the cost. During optimization, such a prize may only be awarded once to avoid causing undue influence in the derived solution path. Since this may bias the solution path to pass through the anchor point as early as possible, a more global solution may be provided by tracking all the possibilities of passing through the anchor point at different parts of the solution when deciding about the shortest path. For example, instead of keeping track of the path with the minimum weight only at every node, a list of the possibilities of passing through the anchor points and their corresponding weights may be maintained.

From the above, it will be appreciated that the one or more anchor points may be used for: (i) constraining the solution path to include the anchor point; (ii) constraining the estimated trajectory using the anchor point; (iii) integrating the anchor point with the navigation solution before the estimation of the trajectory; and (iv) weighting the global optimization problem based on proximity to the anchor point.

The above discussions have related to global shape matching an estimated trajectory to map information in which the trajectory is limited to a single floor. However, the techniques of this disclosure may be extended to multi-floor environments as desired. Different approaches may be used to accommodate transitions from one floor to another. Notably, a detection of a floor change may be based on any suitable source of information. For example, if device has a barometer, such as may be implemented by external sensor 114 or auxiliary sensor 116, a floor transition may be detected with a relatively high degree of accuracy, both with respect to confirming the change in level as well as the time at which the change occurred. A floor change may be associated with various modalities, including powered examples such as an elevator or an escalator and unpowered examples such as a flight of stairs or a ramp. Further, such modalities may have known locations that may be associated to the map information. As an illustration, an escalator typically has a set exit point for a given floor (as well as an assumed heading). Thus, an estimation may be made if the floor transition occurred through an elevator, an escalator, stairs or other map feature by recognizing characteristic motion sensor data patterns or other techniques. By establishing a time and position of the floor transition, the floor change modality and its location may be known without ambiguity, allowing the estimated trajectory to be shape matched in distinct steps. For example, the floor change may be used as the second position for one subtrajectory and as the first position for the related subtrajectory. The global shape matching may then be applied to each subtrajectory independently and combined after the solution path for each is derived. Thus, each floor transition may be used to divide the overall trajectory.

Using motion sensor data to estimate a floor transition method may create ambiguity in some implementations. For example, the modality may not be identified or incorrectly identified, such as when a person moving on an escalator may be detected as traversing stairs When such ambiguities exist and the floor change modality and location are ambiguous (not definitely known), the global shape matching may be performed multiple times to account for each possibility. Since each possibility may be used to derive a solution path, the path representing the lowest cost, and correspondingly, the best match in shape, may be selected as the final solution path. For example, at least one alternative subtrajectory may be estimated based at least in part on the detected floor change to accommodate a different assumption regarding the floor change modality and location. The global shape matching may be performed for each estimated subtrajectory. By reconstructing possible estimated trajectories from the alternative subtraejctories, and comparing results for each possible estimated trajectory, the solution path may be derived.

It will further be appreciated that the more accurate determination of a user's trajectory through an environment enabled by the global shape matching techniques of this disclosure may be utilized in any number of applications. For example, the motion sensor data collected from the mobile devices of shoppers in a retail store may be used to derive solution paths representing their trajectories and provide analytics about their shopping behavior. In one aspect, the analytics may be aggregate analytics obtained from a plurality of users and may be used for any purpose including generating heat maps that indicate areas of the retail store or other environment exhibiting increased attention, determining the wait times associated with checkout lane queues, or any other suitable purpose. The analytics may be aggregated for multiple users for a specific store, for a category of stores or any other suitable grouping. In another aspect, the analytics may be specific to a given user, to be used for retargeting with advertisement or offers, identification of brand preference, or any other characteristic of shopping behavior. Thus, user analytics may be for a single user or may be aggregated analytics for multiples users. Further, solution paths derived by global shape matching may be used in a variety of crowdsourcing applications by leveraging information obtained from the plurality of users to achieve any suitable goal, such as acquiring more accurate location information. As an illustration only, WiFi, Bluetooth®, Bluetooth Low Energy (BLE), and/or magnetic fingerprinting may be used for real time indoor positioning by correlating signatures recorded by sensors with locations. Under the techniques of this disclosure, a wireless communication device, such as a WiFi or Bluetooth transceiver, may be considered a sensor for these purposes, as characteristics of the wireless communication signal may be detected and measured. For example, the received signal strength indicator (RSSI) may be used when determining a sensor fingerprint. Conventionally, such methods require surveying the navigation environment beforehand to provide adequate correlation of the fingerprints to the indoor locations, involving significant expenditures of time and equipment. Such surveys may be replaced or reduced by crowdsourcing. Since the solution paths represent relatively accurate position information, sensor readings taken while each user traverses the trajectory may be stored and correlated with the determined locations. By collecting such data from a wide variety of users at different times, suitable signal fingerprint maps may be generated and used for subsequent indoor position determinations.

For any of the above analytics and crowdsourcing applications or others, an uncertainty in the position estimated by the shape matching method may be determined and used to help weight the analytics, crowdsourcing or other application. Notably, the motion sensor data is processed at a number of stages as navigation solutions are determined to estimate trajectories that are then shape matched. To estimate the overall uncertainty in the resulting solution path, errors that may arise at each stage may be considered. Further, uncertainty may be (i) cross-track uncertainty, (ii) along-track uncertainty, or (iii) a combination of cross-track and along-track uncertainties. For example, an uncertainty determination may be made with respect to the three stages discussed below.

A first stage may account for any errors that arise as the raw sensor data is processed to determine sensor-based portable navigation solutions, such as by navigation module 120 as noted above. During this stage, there may be uncertainty attributed to: i) the uncertainty of the sensor-based navigation solution; ii) the uncertainty in estimating the misalignment between the heading of the IMU device and that of the platform (e.g. a shopper), if available; and iii) the uncertainty in step detection and step length estimation for a pedestrian, if available.

A next stage may represent the transition from the sensor-based navigation solutions to the vectorized estimated trajectory. In each segment of the vectorized trajectory, there may be a point by point error difference between the vectorized trajectory and the estimated trajectory. This uncertainty may be accommodated as a point by point error, its maximum, or its average along each segment as a factor when estimating the overall uncertainty.

A further stage may represent the optimization performed when global shape matching the vectorized trajectory to the map information to derive a solution path. Uncertainty during this stage may be evaluated in light of factors including the cost function that was used for the shape matching method, as this provides the measure of resemblance between the shape of the vectorized trajectory and the solution path. In one aspect, the parameters of the cost function may be adjusted to be numerically more meaningful. The error in the distance and relative angles between the shape matching solution path and the vectorized trajectory may be evaluated at a number of nodes before and after the link of interest.

Further, when implementing the optimization algorithm on the DAG, each node may be assigned the lowest cost in all the links leading to it. Correspondingly, the difference in cost between the best link and its lower alternatives may be used as a measure of uncertainty. As will be appreciated, when a number of links are close to each other in terms of cost, it may indicate difficulty in differentiating between the alternatives, which implies uncertainty. Similarly, the uncertainty for the chosen node in each level in the DAG may be estimated by comparing its cost to any alternative nodes in the same level. To take the effect of the global shape into consideration, the shortest path problem on the DAG is solved back to forth; starting from the node representing the second position and ending at the node representing the first position. Thus, the cost of the shortest path to the start as well as the shortest path to the end nodes is known at each node. Having two nodes on the same level with nearly similar costs to the start node does not imply ambiguity if one of them has a considerably higher cost of path to the end node, as the shape of the rest of the trajectory favors one of them over the other. This may be accounted for by adding the cost of the shortest paths to the start and the end nodes when comparing two nodes on a given level of the DAG for uncertainty.

Another additional factor to specify the uncertainty may be the number of map nodes the solution passes by before taking a turn. This is because the more map nodes the solution passes by, the more turn possibilities there are and the more ambiguity the solution encounters. In another embodiment, this factor may appear in the form of the density of nodes, which is the number of nodes normalized by the distance traveled, the solution passes by before a turn rather than their number.

An additional factor when determining uncertainty may involve any available anchor points. In one example, the global shape matching may be performed twice, once with the absolute position updates taken into consideration and once without them to derive two solution paths. Any difference between the solution paths may be used when estimating the overall uncertainty. Further, the more a solution path needs to be modified to pass through an anchor point, the greater the degree of uncertainty regarding the anchor point may be. Conversely, the uncertainty may be reduced whenever the solution path passes through an anchor point, with little or no modification.

By following the above techniques, an uncertainty measure may be estimated for the full 2D or 3D position estimate, or it may be segregated into an along track uncertainty measure and a cross track uncertainty measure, or may be any combination. The along track uncertainty is the uncertainty of positioning the user or platform along the direction of motion (which would be along the map link), whereas the cross track uncertainty is the uncertainty of positioning the user or platform in the lateral direction or the perpendicular direction to the direction of motion (which would be the uncertainty in identifying the map link itself). In some embodiments, it may be desirable to express the uncertainty measure estimated for any of the above stages or for the overall solution path as a standard deviation.

Several factors may be used to specify the along track uncertainty. For a link on the DAG, if we are certain about one node and uncertain about the other, may be because it has competitors of very close cost, this may be used as an indication of the along track error. The value of the estimated along track error may depend on the distance between the uncertain node and its competitors. Another factor that could be used to determine the along track uncertainty is the difference between the distance estimated by the sensor only solution and the corresponding matched distance in the final solution. An additional factor that may be used in determining the along track uncertainty is the number of stops in a certain link. This is because each stop may be associated with missing steps and thus more uncertainty in the estimated distance. Another factor that may be used in the along track uncertainty is the number of map nodes the solution passes by or the density of those nodes (number of nodes per distance traveled).

As noted above, map information may be obtained from any suitable source, such as from on-line map service providers or from the operator of the venue being traversed. As necessary, the map information may be processed into a form suitable for use, such as by forming a grid map. On-line indoor/outdoor map service providers may provide web Application Programming Interfaces (APIs) to access their map database. Accordingly, the corresponding APIs from the map provider may be used to obtain map information for an area encompassing the user's trajectory. Particularly notable examples of venues that may have corresponding map information include indoor environments such as retail stores that may also provide point of sale information for determining anchor points. This map information may be processed to facilitate its use, such as by decoding to extract the necessary map data used for techniques of this disclosure using the APIs and converted into a unified format such as the Geographic Javascript Objective Notation (GeoJson) format, although xml files, binary files and others may be used. The converted map data can then be saved in the local storage for the future use. The decoding and conversion may be performed by external resources and delivered in any suitable manner for use during global shape matching. Generally, it is desirable to minimize the number of times processing operations are performed for each venue.

In some embodiments, obtained map information may be processed using geometric techniques by segregating it into traversable and non-traversable regions. For example, corridors represent an important class of traversable regions in typical indoor environments, such as a retail venue of the like. As such, a corridor clipping function may be performed to extract corridor shape information from background entities if the corridor information is not available, as many conventional map service providers do not offer corridor shape information. Therefore, a suitable technique for obtaining the shape of corridors that may be present in the venue may include extracting all the other entities from the background entity. The background entity may be a boundary contour that establishes a given building or level of a building or other venue. Foreground entities within a venue may include all objects such as stock shelves, rooms, checkout stands, elevators, escalators, stock shelves, rooms, checkout stands, wall boundaries and other obstacles within the area encompassed by the map. The clipping process as used herein refers to the process of cutting away from a set of 2-dimensional geometric shapes those parts that are outside a particular 'clipping' window. This can be achieved by intersecting a subject polygon (background entity) with a clipping polygon (other foreground entities on top of the background entities). The polygons may be defined by a sequence of vertices and any curves may be represented as an appropriate set of line segments.

Figure 18:
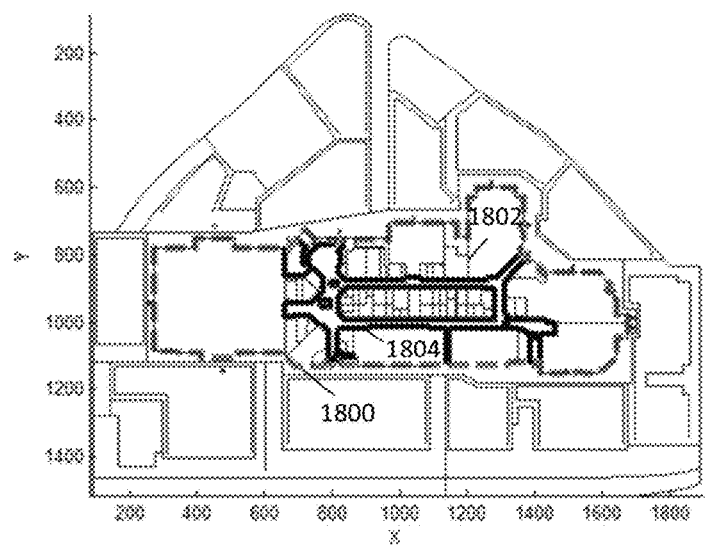
FIG. 18 is a schematic representation of map entity clipping in a geometric map according to an embodiment.

After iteratively clipping all the other entities from the background, the corridor polygon may be obtained. A suitable clipping algorithm may be configured to accommodate relatively complex polygons with holes, for example, the Vatti clipping algorithm. An illustration of the results of a clipping algorithm are shown in FIG. 18 for a representative polygon based geometric indoor map. The background entity 1800 for a portion of the map is represented by a dashed line. Foreground entities are represented as polygons with fine lines, such as polygon 1802 (the others are not labeled to preserve clarity), are clipped on top of background entity 1800. The resulting polygon 1804, represented by the heavy line, gives the shape of the corridor. The resulting corridor shape may be represented by a complex polygon. A complex polygon used herein is a polygon (without self-intersection) which has one or multiple holes inside. In addition, processing may include decomposing one or more shapes of the map. A trapezoid decomposition may be used to decompose relatively complex polygons into more simple trapezoids, while a convex decomposition may be used to partition relatively complex polygons into more simple convex polygons. An optimal decomposition algorithm may be applied to generate a reduced number of polygons after the decomposition process. Any one or combination of decomposition methods may be employed.

As mentioned earlier, some map features or entities may also provide inherent position information, such as elevators, escalators, stairs that may be associated with level change scenarios or conveyors that may allow the assumption of heading or other position information. The locations of the entrances and exits within environment, such as doors or the like, may also provide position information. Still further, the direction of the entrances/exits may also be used when determining initial or final headings. In a multi-level venue, the height of each level may be used with sensor information indicating changes in elevation to help determine when a level change scenario may exist. Notably, such position information may be used when establishing boundaries such as the first and/or second position of the trajectory.

Figure 19:
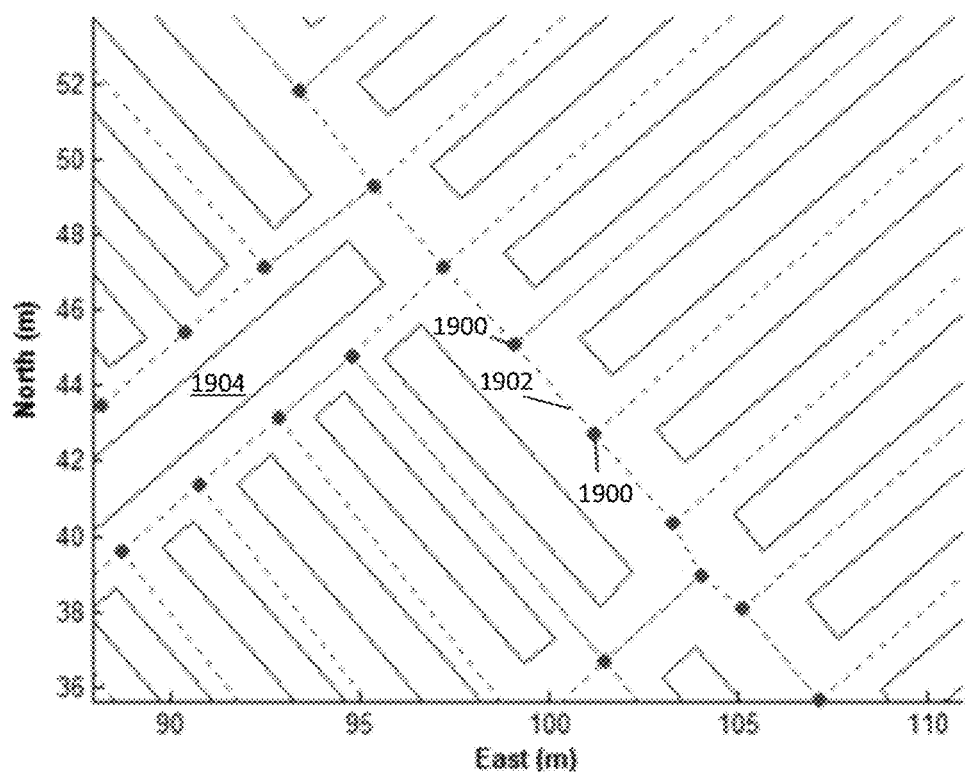
FIG. 19 is a schematic representation of grid map according to an embodiment.

Processing the map information may also include transforming the traversable areas of the indoor maps with connected traces and nodes in a grid map. Connected traces and nodes may contain both geometric and topological information of the map. Any suitable technique may be used to generate the grid map, such as for example by using a voronoi diagram, to represent possible trajectories through the venue. An example voronoi diagram is shown in FIG. 19, and includes the characteristic elements of nodes, represented by circles, such as nodes 1900 and traces, represented by the connecting lines, such as trace 1902. A node is any point on the map equidistant to three or more closest objects, the map entities indicated by solid polygons, such as element 1904. In this example, the map entities shown are rectangular shelves. To illustrate these concepts, it may be seen that each node 1900 has three equidistant closest objects, namely the three surrounding shelves. Correspondingly, a trace is a set of points (i.e., a line) which is equidistant to only two closest objects. The straight line connecting nodes 1900 is an example of a trace, trace 1902, as each point of the line has only two closest objects. Thus, the grid map shown in FIG. 19 is characteristic of a retail venue with regularly spaced rectangular shelves, with the nodes and tracks representing candidate paths that a user could take around the map entities. Depending on the configuration of the retail venue, the nodes and traces developed from the voronoi diagram may not account for all possible routes, such as routes around objects which are located at the perimeter of open spaces in the retail venue. Additional operations may be performed to complete the possible routes by adding supplemental nodes and traces. The supplemental nodes and traces complete candidate paths around map entities.

Figure 20:
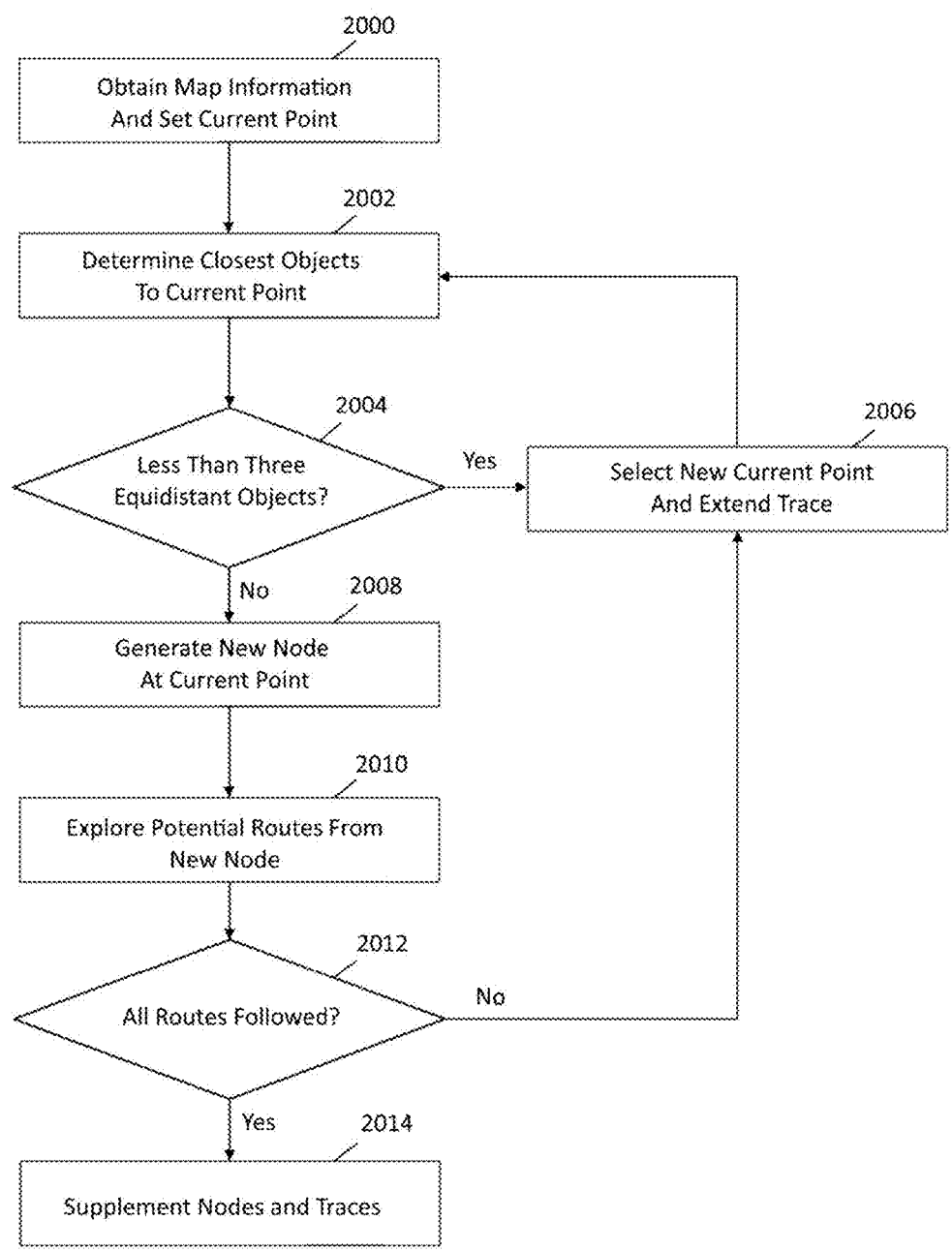
FIG. 20 is a schematic representation of routine for generating a grid map according to an embodiment.

One suitable routine for generating a grid map for use in ordering anchor points is represented by the flowchart shown in FIG. 20. Beginning with 2000, map information for a venue, such as a retail store, may be obtained, with map entities represented by polygons as discussed above. An initial starting position may be selected to as the current point for generation of the voronoi diagram. In 2002, the closest objects to the current point are determined. The routine branches in 2004, depending on the number of closest objects. If less than three closest objects are equidistant, a new current point is selected and a trace is created or continued to the new current point in 2006. The routine then returns to 2002 to determine the closest objects with respect to the new current point. If three or more closest objects are equidistant in 2004, the current point is designated a node in 2008. Next, possible routes starting from the new node are explored in 2010. A determination is made in 2012 if a new route may be started. If so, the routine returns to 2006 and a trace is formed to a new current point along the new route. If it is determined in 2012 that all possible routes have been explored, the routine continues to 2014 to determine whether any supplemental nodes and/or traces are required to complete routes around any of the map entities as described above. The complete set of nodes and traces than may be used for global shape matching to the vectorized trajectory as described herein. A grid map may enhance the geometric aspects of map information as well as providing topological aspects. For example, a retail venue map may be readily divided into structured areas and non-structured areas. Non-structured areas, such as open space, isolated booths and the like, may benefit from geometric based techniques as described above. However, structured areas, such as aligned shelves, booths and similar features may be abstracted as connected traces and nodes to be used in a grid based map.

Contemplated Embodiments

The portable device's body frame may be as follows: x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigation information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigation information (e.g. GNSS); the forward integrated navigation solution in the device integrating the available sensors with the absolute navigation information (e.g. GNSS) and possibly with the optional speed or velocity readings; or a backward smoothed integrated navigation solution integrating the available sensors with the absolute navigation information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map aided or model aided routine. Map aided or model aided can further enhance the navigation solution during the absolute navigation information (such as GNSS) degradation or interruption. In the case of model aided, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for enhancing a navigation solution of a portable device and a platform using map information, wherein the mobility of the device is constrained or unconstrained within the platform and wherein the device may be tilted to any orientation, the method comprising:
    a) obtaining sensor data for the portable device representing motion of the portable device at a plurality of epochs over a first period of time from a first position to a second position;
    b) estimating a trajectory for the portable device from the obtained sensor data over the first period of time;
    c) obtaining the map information for an environment encompassing locations of the portable device during the first period of time;
    d) generating a directed acyclic graph for the environment based at least in part on the map information;
    e) representing the estimated trajectory using a set of connected vectors; and
    f) deriving a solution path by performing global shape matching of the set of connected vectors as an aggregate whole from the first position to the second position to the directed acyclic graph as a global optimization problem, wherein the enhanced navigation solution comprises the derived solution path.

2. The method of claim 1, wherein performing the global shape matching as the global optimization problem uses graph theory.

3. The method of claim 1, wherein estimating the trajectory for the portable device comprises generating a forward trajectory using the sensor data beginning at the first position.

4. The method of claim 3, further comprising compensating for estimated drift.

5. The method of claim 4, wherein the drift is estimated based at least in part on comparing a heading determined at the second position from the sensor data with a heading taken from the estimated trajectory at the second position.

6. The method of claim 4, wherein the drift is estimated based at least in part on determining a rate of heading change from the sensor data during a portion of the estimated trajectory exhibiting straight motion or no motion.

7. The method of claim 3, wherein estimating the trajectory for the portable device further comprises generating a backward trajectory using the sensor data beginning at the second position and merging the forward trajectory and the backward trajectory.

8. The method of claim 7, wherein generating the backward trajectory comprises inverting the sensor data.

9. The method of claim 7, wherein merging the forward trajectory and the backward trajectory comprises combining accumulated change in heading and distance travelled for the forward trajectory and the backward trajectory.

10. The method of claim 7, wherein merging the forward trajectory and the backward trajectory comprises combining consecutive change in latitude and longitude for the forward trajectory and the backward trajectory.

11. The method of claim 1, wherein the estimated trajectory is based on at least one of a forward trajectory and a backward trajectory and wherein generating at least one of the forward trajectory and the backward trajectory includes a smoothing operation over the first period of time.

12. The method of claim 1, wherein the estimated trajectory is based on at least a backward smoothing operation over the first period of time.

13. The method of claim 1, wherein the estimated trajectory is based on at least a multiple pass smoothing operation over the first period of time.

14. The method of claim 1, wherein the estimated trajectory is based on at least one of a forward trajectory and a backward trajectory and wherein generating at least one of the forward trajectory and the backward trajectory comprises filtering heading information for the navigation solution of at least one epoch of the plurality of epochs.

15. The method of claim 14, wherein filtering heading information comprises applying a zero-phase low pass filter.

16. The method of claim 1, wherein representing the estimated trajectory using the set of connected vectors comprises providing a piece-wise linearized approximation of the estimated trajectory.

17. The method of claim 16, wherein the piece-wise linearized approximation comprises a series of points on the estimated trajectory, such that each adjacent pair of points defines a vector in the set of connected vectors.

18. The method of claim 17, wherein representing the estimated trajectory using the set of connected vectors further comprises minimizing a number of vectors in the set of connected vectors while satisfying an error threshold.

19. The method of claim 17, wherein representing the estimated trajectory using the set of connected vectors further comprises combining sequential vectors when a change in vector angles is below a threshold.

20. The method of claim 1, wherein the map information is at least one of: (i) comprising a grid map of connected links and nodes, and (ii) being used to generate a grid map of connected links and nodes.

21. The method of claim 20, wherein the grid map may represent at least one of an indoor venue, a retailer venue, an outdoor venue, a street map, a trails map, a pipeline map and a flight map.

22. The method of claim 20, wherein the grid map is used to generate the directed acyclic graph, and wherein the global shape matching of the set of connected vectors to the directed acyclic graph comprises matching nodes of the directed acyclic graph to nodes of the set of connected vectors, wherein each connection between adjacent vectors defines a node of the set of connected vectors.

23. The method of claim 20, wherein the directed acyclic graph has a number of rows equivalent to a number of vectors in the set of connected vectors.

24. The method of claim 23, wherein the global shape matching of the set of connected vectors to the directed acyclic graph further comprises evaluating links between nodes of the directed acyclic graph and the set of connected vectors as a cost function.

25. The method of claim 24, wherein the cost function depends at least in part on a difference in length between nodes of the directed acyclic graph and a corresponding vector from the set of connected vectors and on a difference in angle between a link and a preceding link.

26. The method of claim 25, wherein the global shape matching of the set of connected vectors to the directed acyclic graph further comprises applying a shortest path algorithm.

27. The method of claim 1, wherein the global shape matching of the set of connected vectors to the directed acyclic graph further comprises utilizing an anchor point associated with the estimated trajectory.

28. The method of claim 27, wherein the utilizing of the anchor point further comprises identifying the anchor point associated with the estimated trajectory.

29. The method of claim 27, further comprising obtaining a plurality of anchor points associated with the estimated trajectory.

30. The method of claim 27, further comprising one or more of the following: (i) constraining the solution path to include the anchor point; (ii) constraining the estimated trajectory using the anchor point; (iii) integrating the anchor point with the navigation solution before estimating the trajectory; and (iv) weighting the global optimization problem based on proximity to the anchor point.

31. The method of claim 27, wherein the anchor point is derived from a source of absolute navigation information for the portable device and wherein the absolute navigation information is obtained from any one or any combination of the following: (i) a global navigation satellite system (GNSS); (ii) cell-based positioning; (iii) WiFi-based positioning; (iv) Bluetooth-based positioning; (v) other wireless-based positioning; and (vi) visual light communication based positioning.

32. The method of claim 27, wherein the anchor point is derived from point of sale information.

33. The method of claim 27, wherein the anchor point is derived from an interaction between the portable device and an item having a known location.

34. The method of claim 1, further comprising detecting a floor change in the estimated trajectory.

35. The method of claim 34, further comprising segregating the estimated trajectory into a plurality of subtrajectories based at least in part on the detected floor change and performing the global shape matching to the directed acyclic graph for each subtrajectory.

36. The method of claim 35, wherein a floor change modality and location are known.

37. The method of claim 35, wherein a floor change modality and location have ambiguity, further comprising estimating alternative subtrajectories based at least in part on the detected floor change covering different assumptions regarding the floor change modality and location, performing the global shape matching for each estimated alternative subtrajectory, reconstructing possible estimated trajectories from the alternative subtraejctories, and comparing results of the possible estimated trajectories to derive the solution path.

38. The method of claim 1, further comprising one of: (i) deriving user analytics based at least in part on the solution path and (ii) deriving aggregate user analytics based at least in part on aggregating solution paths derived for a plurality of trajectories within the environment for the users.

39. The method of claim 1, further comprising crowdsourcing by aggregating solution paths derived for a plurality of trajectories within the environment.

40. The method of claim 39, further comprising recording sensor measurements taken with the portable device and correlating the sensor measurements with at least one location along the solution path.

41. The method of claim 40, further comprising building a fingerprint map with the recorded sensor measurements.

42. The method of claim 1, further comprising determining uncertainty for the solution path.

43. The method of claim 42, wherein the uncertainty is one of the following:
   (i) cross-track uncertainty,
   (ii) along-track uncertainty, and
   (iii) a combination of cross-track and along-track uncertainties.

44. The method of claim 42, wherein the determined uncertainty is at least one of: the estimated trajectory uncertainty, the set of connected vectors uncertainty and the global shape matching to the directed acyclic graph uncertainty.

45. The method of claim 42, further comprising deriving user analytics based at least in part on the solution path and the determined uncertainty.

46. The method of claim 42, further comprising crowdsourcing by aggregating solution paths derived for a plurality of trajectories within the environment based at least in part on the determined uncertainty.

47. A portable device for enhancing a navigation solution of the portable device and a platform using map information, wherein the mobility of the portable device is constrained or unconstrained within the platform and wherein the portable device may be tilted to any orientation, the portable device comprising:
   a) an integrated sensor assembly, configured to output sensor data representing motion of the portable device for the portable device at a plurality of epochs over a first period of time from a first position to a second position;
   b) a navigation module configured to derive navigation solutions based at least in part on the sensor data at the plurality of sensor epochs and estimate a trajectory for the portable device from the obtained sensor data over the first period of time; and
   c) a global optimizer configured to:
      i) obtain the map information for an environment encompassing locations of the portable device during the first period of time;
      ii) generate a directed acyclic graph for the environment based at least in part on the map information;
      iii) represent the estimated trajectory using a set of connected vectors; and
      iv) derive a solution path by performing global shape matching of the set of connected vectors as an aggregate whole from the first position to the second position to the directed acyclic graph as a global optimization problem, wherein the enhanced navigation solution comprises the derived solution path.

48. The portable device of claim 47, further comprising a source of absolute navigation information for the portable device, wherein the global shape matching is based at least in part on the absolute navigation information.

49. The portable device of claim 48, wherein the absolute navigation information is obtained from any one or any combination of the following: (i) a global navigation satellite system (GNSS); (ii) cell-based positioning; (iii) WiFi-based positioning; (iv) Bluetooth-based positioning or (v) other wireless-based positioning.

50. The portable device of claim 47, wherein the integrated sensor assembly includes an accelerometer and a gyroscope.

51. The portable device of claim 47, wherein the integrated sensor assembly comprises an inertial sensor implemented as a Micro Electro Mechanical System (MEMS).

52. A remote processing resource comprising at least one processor for enhancing a navigation solution of a portable device and a platform using map information, wherein the mobility of the portable device is constrained or unconstrained within the platform and wherein the portable device may be tilted to any orientation, the remote processing resource comprising:
   a) a communications module for receiving information provided by the portable device, wherein the information corresponds to a plurality of epochs over a first period of time of sensor data representing motion of the portable device from a first position to a second position; and
   b) the at least one processor configured as a global optimizer to:
      i) obtain the map information for an environment encompassing locations of the portable device during the first period of time;
      ii) generate a directed acyclic graph for the environment based at least in part on the map information;
      iii) represent a trajectory estimated from the sensor data using a set of connected vectors; and
      iv) derive a solution path by performing global shape matching of the set of connected vectors as an aggregate whole from the first position to the second position to the directed acyclic graph as a global optimization problem, wherein the enhanced navigation solution comprises the derived solution path.

53. The remote processing resource of claim 52, wherein the information received by the communications module comprises the sensor data for the portable device representing the motion of the portable device at the epochs and wherein the remote processing resource is further configured to derive navigation solutions for the epochs based at least in part on the sensor data and estimate the trajectory from the derived navigation solutions.

54. The remote processing resource of claim 52, wherein the information received by the communications module comprises navigation solutions derived for the epochs by the portable device and wherein the remote processing resource is further configured to estimate the trajectory from the derived navigation solutions.

55. The remote processing resource of claim 52, wherein the information received by the communications module comprises the estimated trajectory.

56. The remote processing resource of claim 52, wherein the communications module is configured to transmit the solution path to the portable device.

57. A system for providing a solution path using map information comprising:
   a) a portable device comprising an integrated sensor assembly, configured to output sensor data representing motion of the portable device for the portable device at a plurality of epochs over a first period of time from a first position to a second position and a communications module for transmitting information corresponding to the epochs; and b) remote processing resources configured to receive the information from the portable device and having a global optimizer configured to:
  i) obtain map information for an environment encompassing locations of the portable device during the first period of time;
  ii) generate a directed acyclic graph for the environment based at least in part on the map information;
  iii) represent a trajectory estimated from the sensor data using a set of connected vectors; and
  iv) derive a solution path by performing global shape matching of the set of connected vectors as an aggregate whole from the first position to the second position to the directed acyclic graph as a global optimization problem, wherein an enhanced navigation solution comprises the derived solution path.

58. The system of claim 57, wherein the information received by the remote processing resources comprises the sensor data for the portable device and wherein the remote processing resources are further configured to derive navigation solutions for the epochs based at least in part on the sensor data and estimate the trajectory from the derived navigation solutions.

59. The system of claim 57, wherein the portable device further comprises a navigation module configured to derive navigation solutions based at least in part on the sensor data at the plurality of epochs, wherein the communications module transmits the navigation solutions to the remote processing resources and wherein the remote processing resources are further configured to estimate the trajectory from the received navigation solutions.

60. The system of claim 57, wherein the portable device further comprises a navigation module configured to derive navigation solutions based at least in part on the sensor data at the plurality of epochs and to estimate the trajectory from the derived navigation solutions, wherein the communications module transmits the estimated trajectory to the remote processing resources.

61. The system of claim 57, wherein the remote processing resources are further configured to transmit the solution path to the portable device.

62. The system of claim 57, wherein the portable device is conveyed by a platform selected from a person, a vehicle, a cycling platform, a land-based vessel, a water-based vessel, an airborne vessel, and an under-water vessel.

* * * * *